(12) United States Patent
Robb et al.

(10) Patent No.: US 10,214,880 B2
(45) Date of Patent: Feb. 26, 2019

(54) SYSTEM AND METHOD OF GREYWATER RECOVERY AND REUSE

(71) Applicant: CANPLAS INDUSTRIES LTD., Barrie (CA)

(72) Inventors: Carl L. Robb, Barrie (CA); N. Scott Baldwin, Midhurst (CA); James Brian Mantyla, Barrie (CA); Michael F. Wilson, Toronto (CA); Stacey Charleen Gay, Toronto (CA); Timothy James Hendrie Poupore, Toronto (CA); Leo Peter Van Kampen, Conestogo (CA); Robert Cooke, Barrie (CA)

( * ) Notice: Subject to any disclaimer, the term of this patent is extended or adjusted under 35 U.S.C. 154(b) by 379 days.

(21) Appl. No.: 14/658,707

(22) Filed: Mar. 16, 2015

(65) Prior Publication Data

US 2016/0177545 A1   Jun. 23, 2016

(30) Foreign Application Priority Data

Dec. 19, 2014   (CA) ..................... 2875412

(51) Int. Cl.
*E03B 1/04* (2006.01)
*E03D 5/00* (2006.01)
(Continued)

(52) U.S. Cl.
CPC .............. *E03B 1/042* (2013.01); *E03B 1/041* (2013.01); *E03D 5/003* (2013.01);
(Continued)

(58) Field of Classification Search
CPC . E03B 1/04; E03B 1/041; E03B 1/042; E03B 2001/045; E03D 5/003;
(Continued)

(56) References Cited

U.S. PATENT DOCUMENTS 524,827 A    8/1894  Jones et al.
621,803 A    3/1899  Felts
(Continued)

FOREIGN PATENT DOCUMENTS

DE         10300450 A1 *  7/2004  ............. B01D 29/01

OTHER PUBLICATIONS

Machine Translation of DE 10300450 A1 (Ehlert) Jul. 2004, retrieved from the internet on Jul. 15, 2017, <URL:https://worldwide.espacenet.com/>, 6 pages.*

*Primary Examiner* — Matthew O Savage
(74) *Attorney, Agent, or Firm* — Polsinelli, PC

(57) ABSTRACT

A greywater recovery and reuse system is shown, including a body for collecting, reconditioning and discharging greywater. The body has an inlet connection to a source of greywater; a filter for filtering the greywater; a tank for receiving the filtered greywater; a disinfector for disinfecting the filtered greywater; a pump for discharging the reconditioned greywater from said tank to a toilet that needs flushing water; a discharge connection to a sanitary sewer system; a fresh water connection and a control system for controlling the operation of the greywater recovery and reuse system. The system includes a controller for operating the system and dealing with certain alarm and status conditions. Methods of operating the system are also comprehended.

13 Claims, 18 Drawing Sheets

(51) Int. Cl.
  *B01D 29/88* (2006.01)
  *B01D 29/60* (2006.01)
  *B01D 29/00* (2006.01)
  *C02F 1/00* (2006.01)
  *C02F 1/76* (2006.01)
  *C02F 103/00* (2006.01)
  *B01D 29/64* (2006.01)

(52) U.S. Cl.
  CPC ........ *B01D 29/0077* (2013.01); *B01D 29/605* (2013.01); *B01D 29/6438* (2013.01); *B01D 29/885* (2013.01); *C02F 1/008* (2013.01); *C02F 1/76* (2013.01); *C02F 2103/002* (2013.01); *C02F 2209/42* (2013.01); *C02F 2303/16* (2013.01); *E03B 2001/045* (2013.01)

(58) Field of Classification Search
  CPC .. E03D 5/006; B01D 29/0077; B01D 29/605; B01D 29/6438; B01D 29/885; C02F 1/008; C02F 1/76; C02F 2103/002; C02F 2209/42; C02F 2303/16
  USPC ......................................................... 210/106
  See application file for complete search history.

(56) References Cited

U.S. PATENT DOCUMENTS

| | | |
|---|---|---|
| 626,244 A | 6/1899 | Pooler |
| 628,987 A | 7/1899 | Maignen |
| 800,113 A | 9/1905 | Kassian |
| 2,992,986 A | 7/1961 | Ingram |
| 3,126,333 A | 3/1964 | Williams |
| 3,335,868 A | 8/1967 | Schiffers |
| 3,680,701 A | 8/1972 | Holca |
| 3,956,128 A | 5/1976 | Turner |
| 4,009,098 A | 2/1977 | Jeris |
| 4,017,395 A | 4/1977 | Davis |
| 4,025,426 A | 5/1977 | Anderson et al. |
| 4,162,218 A * | 7/1979 | McCormick ............ C02F 1/006 137/386 |
| 4,334,990 A | 6/1982 | du Manoir de Juaye et al. |
| 4,349,436 A | 9/1982 | Kaump |
| 5,006,240 A | 4/1991 | Steffero, Sr. |
| 5,009,776 A | 4/1991 | Banks |
| 5,035,011 A | 7/1991 | Rozenblatt et al. |
| 5,106,493 A | 4/1992 | McIntosh |
| 5,472,610 A | 12/1995 | Jonsson |
| 5,486,657 A * | 1/1996 | Bell ........................ H05K 1/117 174/250 |
| 5,672,281 A * | 9/1997 | Burns .................. B01D 29/071 210/102 |
| 5,980,748 A | 11/1999 | Auger et al. |
| 6,123,840 A | 9/2000 | Suzuki et al. |
| 6,423,216 B1 | 7/2002 | Yum et al. |
| 7,300,570 B2 | 11/2007 | Yang et al. |
| 7,785,469 B2 | 8/2010 | Maclean |
| 2012/0037234 A1 | 2/2012 | Eckman |
| 2012/0199220 A1 | 8/2012 | Knepp et al. |
| 2014/0014277 A1 * | 1/2014 | Clark ....................... C02F 1/048 159/16.1 |

\* cited by examiner

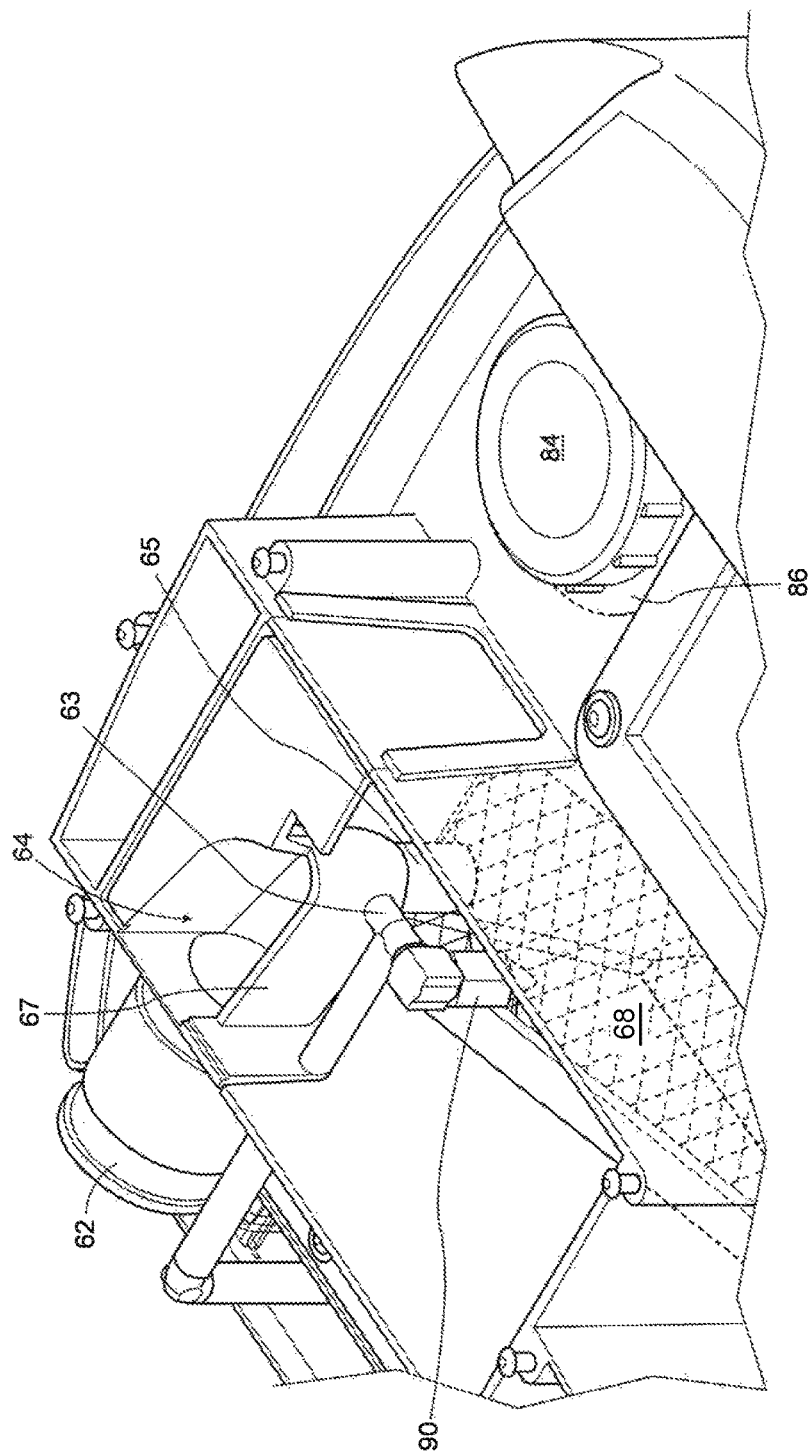

SYSTEM AND METHOD OF GREYWATER RECOVERY AND REUSE

FIELD OF THE INVENTION

This invention relates generally to the field of greywater recovery and reuse and in particular to a system and methods of operating the greywater system that permits the recovery and reuse of, for example, residential greywater to reduce potable water demand and consumption and water treatment loads on downstream wastewater treatment facilities.

STATEMENT REGARDING PRIOR ART DISCLOSURES BY THE INVENTOR OR A JOINT INVENTOR UNDER 37 C.F.R. 1.77(b)(6)

A presentation describing features of the subject invention was made to a home builder on Jun. 12, 2014 in Kitchener, Ontario, Canada. On Jun. 12, 2014, in Bowmanville, Ontario, Canada, the features of the subject invention were described in a meeting with plumbing inspectors and planning department personnel. On Jun. 19, 2014, a presentation describing features of the subject invention was made to a home builder in Toronto, Ontario, Canada. Features of the subject invention were described on Oct. 9, 2014 at the Walter Smart Innovations Conference held in Las Vegas, Nev. In all instances, the features were described verbally. No hand models or presentation materials explicitly depicting the features of the subject invention were shown.

BACKGROUND OF THE INVENTION

Fresh water is recognized as a valuable resource. For much of the industrialized world fresh water is treated in a centralized water purification plant to make it potable (that is purified enough to be safely consumed by humans without threat of catching water borne diseases) and then placed in a fresh water distribution system. However growing populations are putting more and more pressure on water sources. Water is required for agriculture as well as for human consumption and there are concerns that water supplies are running low in many areas. Therefore there is a general understanding that there is a need for water conservation.

In many parts of the world droughts can affect the amount of available water. In the case of a serious drought or even if there is a dry spell in certain areas, restrictions can be imposed on the local population's water use. For example there may be a restriction on lawn watering or the like. In severe cases there may not be enough potable water for even basic human needs such as showers and baths. What is desired therefore is way to reduce water consumption and waterwaste.

Water is used by households. Greywater, also referred to as "gray water", "graywater" or "grey water", is defined as water which has been used, for example, for washing purposes. Sources for greywater in a home, for example, would be showers, baths and perhaps washing machines and lavatory sinks. Black water, on the other hand, contains sewage and typically is produced by toilets and is directed to a sanitary sewer. Typically in a modern dwelling, all of the water which goes down a drain, from any source, is directed to the sewer, where it is taken to a sewage treatment plant for treatment, prior to being released into the environment. All of the water that is treated in the wastewater treatment plant was first treated in the water purification plant where the water was taken out of the environment and then purified and made potable.

Currently residential homes have two large sources of water consumption, namely, human washing in showers and baths and human waste disposal by toilet flushing. While the specific consumption varies from house to house, in general the water use statistics show that on average about 25% to 40% of water use is in showers and baths and that about 20% and 30% of water use is in toilet flushing.

In the prior art there are systems proposed for using recycled greywater to flush toilets instead of potable water. This has the promise of reducing the demand for water by about 30% or more as well as reducing the load on the wastewater treatment plants. Therefore it is highly desirable. Using recycled greywater for toilet flushing makes sense because the toilet water is primarily for transporting harmful wastes out of the home and so toilet flush water does not need to be potable, even though it currently is in most cases.

However what is required is a system that can capture the greywater and make it suitable for toilet flushing. Thus, the greywater cannot contain so much organic material that it builds up a scum, a bacteria mat or the like within the toilets where it is used. What is required is a greywater recycling system that can reliably capture, condition and recirculate greywater for toilet flushing purposes. Such a system cannot permit the development of foul odors, must be reliable and have certain fail safe measures built into it to ensure that the operation of the system is reliable, clean and uninterrupted. Such a system must be carefully designed to deal with upsets and interruptions to avoid having the operation of the system, and thus the toilet flushing which relies on such a system, compromised.

Greywater recovery systems have been proposed in the past. However such systems have suffered from certain problems, for example, in some prior art systems attempts are made to recapture all water, including washing machine and black water. However, this introduces many more contaminants into the water recovery system and makes it much more difficult to condition the greywater. In other cases the system attempts to only capture shower and bath water. An example of such a system is shown in US Patent Application No. US20080314457. However, in practice, this prior art system has a number of limitations, including, that a unit is required for each bathroom, there is no sterilization, it requires two tanks on each unit and a siphon system inbetween, and thus can only manage a small volume.

Examples of other prior systems include:
U.S. Pat. No. 524,827 issued Aug. 21, 1894
U.S. Pat. No. 621,803 issued Mar. 28, 1899
U.S. Pat. No. 626,244 issued Jun. 6, 1899
U.S. Pat. No. 628,987 issued Jul. 18, 1899
U.S. Pat. No. 800,113 issued Sep. 19, 1905
U.S. Pat. No. 2,992,986 issued Jul. 18, 1961
U.S. Pat. No. 3,126,333 issued Mar. 24, 1964
U.S. Pat. No. 3,335,868 issued Aug. 15, 1967
U.S. Pat. No. 3,680,701 issued Aug. 1, 1972
U.S. Pat. No. 3,956,128 issued May 11, 1976
U.S. Pat. No. 4,009,098 issued Feb. 22, 1977
U.S. Pat. No. 4,025,426 issued May 24, 1977
U.S. Pat. No. 4,334,990 issued Jun. 15, 1982
U.S. Pat. No. 5,006,240 issued Apr. 9, 1991
U.S. Pat. No. 5,009,776 issued Apr. 23, 1991
U.S. Pat. No. 5,472,610 issued Dec. 5, 1995
U.S. Pat. No. 5,980,748 issued Nov. 9, 1999
U.S. Pat. No. 6,123,840 issued Sep. 26, 2000
U.S. Pat. No. 6,423,216 issued Jul. 23, 2002
U.S. Pat. No. 7,300,570 issued Nov. 27, 2007
U.S. Pat. No. 7,785,469 issued Aug. 31, 2010

SUMMARY OF THE INVENTION

What is desired is a single self-contained greywater system that can recover condition and reuse greywater for a whole dwelling. Most preferably such a system would be simple and yet provide a reliable place for temporarily storing greywater to be used in toilet flushing. Such storage would be accomplished in a way that prevents bacteria or other contaminants from building up creating foul odours or the like. Further, most preferably the system is housed in a self-contained units that can be easily placed in, for example, a basement or the like adjacent to the existing household systems such as water heaters, furnaces or the like. A control system can be provided in association with the self-contained units to ensure the smooth operation of the unit according to certain design principles and alarm sequences.

According to a first aspect of the invention there is provided a greywater recovery and reuse system comprising:
  a body for collecting, conditioning and discharging greywater, said body having:
    a. an inlet connection to a source of greywater;
    b. a filter for filtering said greywater;
    c. a tank for receiving said filtered water;
    d. a disinfector for disinfecting said filtered greywater;
    e. a pump, for discharging said conditioned greywater from said tank;
    f. a discharge connection to a sanitary sewer system;
    g. a connection to a source of fresh water; and
    h. a control system for controlling the operation of said greywater recovery and reuse system.

According to a second aspect of the present invention there is provided a control system for a greywater recovery and reuse system, said greywater system having a tank, a filter upstream of said tank, a fresh water connection outlet, said control system comprising:
  a. a controller;
  b. a water level sensor for said tank connected to said controller;
  c. a source of power for said controller;
  d. at least one solenoid actuable by said controller; and
  e. a pump switch connected to said controller for turning said pump on and off, and a timing means.

According to a further aspect of the present invention there is provided a method of capturing and reconditioning greywater for toilet flushing, said method comprising the steps of:
  a. installing a greywater capture and reconditioning system in a building by
  b. connecting a tank of said system up to a greywater collection network within the building, a source of fresh water, a sanitary drain and a return line to at least one toilet;
  c. initializing the system by adding a volume of at least one flush of fresh water to the tank;
  d. receiving from said collection network greywater into said system filtering the greywater before the greywater enters said tank,
  e. disinfecting said greywater;
  f. sensing a need for greywater upon a toilet being flushed; and
  g. pumping said greywater to said toilet as needed.

According to a further aspect of the invention there is provided a greywater recovery and reuse system for collecting and reconditioning greywater, and filling a toilet tank with said reconditioned greywater, said system comprising:
  a controller to control operation of said system;
  an inlet connectable to a source of greywater;
  a holding tank configured to receive said greywater water from said inlet;
  a greywater reconditioning system configured to recondition said greywater prior to being received in said holding tank, said reconditioning system comprising a filter positioned between said inlet and said holding tank;
  a pump operatively connected to said controller, fluidly connected to a bottom of said holding tank, and having an outlet fluidly connectable to said toilet tank via a greywater circulation line; and
  a toilet tank level sensor operatively connected to one of said controller and said pump, said toilet tank level sensor being configured to detect when a level of said reconditioned greywater in said toilet tank is less than a predetermined level;
  wherein said system is configured to maintain said reconditioned greywater in said toilet tank at said predetermined level by activating said pump when said level is less than said predetermined level to increase said level to said predetermined level; and
  wherein said controller is configured to monitor activation of said pump for an identifiable signature of a toilet tank leak.

According to a further aspect of the present invention there is provided a method of collecting and reconditioning greywater, and filling a toilet tank with said reconditioned greywater, said method comprising the steps of:
  passing greywater from a source of greywater through a greywater reconditioning system into a holding tank;
  detecting a demand for said reconditioned greywater in said toilet tank;
  activating a pump to supply said reconditioned greywater from said holding tank to said toilet tank to meet said demand;
  monitoring activation of said pump for an identifiable signature of a toilet tank leak.

According to a further aspect of the present invention there is provided a greywater recovery and reuse system for collecting and reconditioning greywater, said system comprising:
  a controller to control operation of said system;
  an inlet connectable to a source of greywater;
  a holding tank configured to receive said greywater water from said inlet;
  a greywater reconditioning system configured to recondition said greywater prior to being received in said holding tank, said reconditioning system comprising a filter positioned between said inlet and said holding tank;
  a filter cleaning system for periodically applying said reconditioned greywater from said holding tank on top of said filter to clean said filter;
  a waste outlet positioned adjacent to said filter to permit anything not passing through said filter into said holding tank to be discharged to said waste outlet; and
  a holding tank level sensor positioned in said holding tank and operatively connected to said controller, said controller being configured to calculate a level of said reconditioned greywater in said holding tank from signals generated by said holding tank level sensor;
  wherein said controller is configured to monitor said level of said reconditioned greywater in said holding tank during operation of said filter cleaning system for an identifiable signature of said filter requiring cleaning.

According to a further aspect of the present invention there is provided a method of collecting and reconditioning greywater, said method comprising the steps of:
  passing greywater from a source of greywater through a greywater reconditioning system into a holding tank, said greywater reconditioning system comprising a filter and a waste outlet adjacent to said filter, said filter being positioned above said holding tank to permit anything not passing through said filter into said holding tank to be discharged to said waste outlet;

periodically cleaning said filter by applying reconditioned greywater from said holding tank on top of said filter to wash away solids into said waste outlet;

monitoring a level of said greywater in said holding tank during said periodically cleaning said filter step for an identifiable signature of said filter requiring cleaning.

BRIEF DESCRIPTION OF THE DRAWINGS

Reference will now be made to preferred embodiments of the invention, by way of example only, having regard to the following drawings:

FIG. 4b is a perspective view of a detail of FIG. 4a;

FIG. 4c is the same view as FIG. 4b of a greywater recovery and reuse system according to another embodiment of the present invention;

DETAILED DESCRIPTION OF THE PREFERRED EMBODIMENTS

Figure 1:
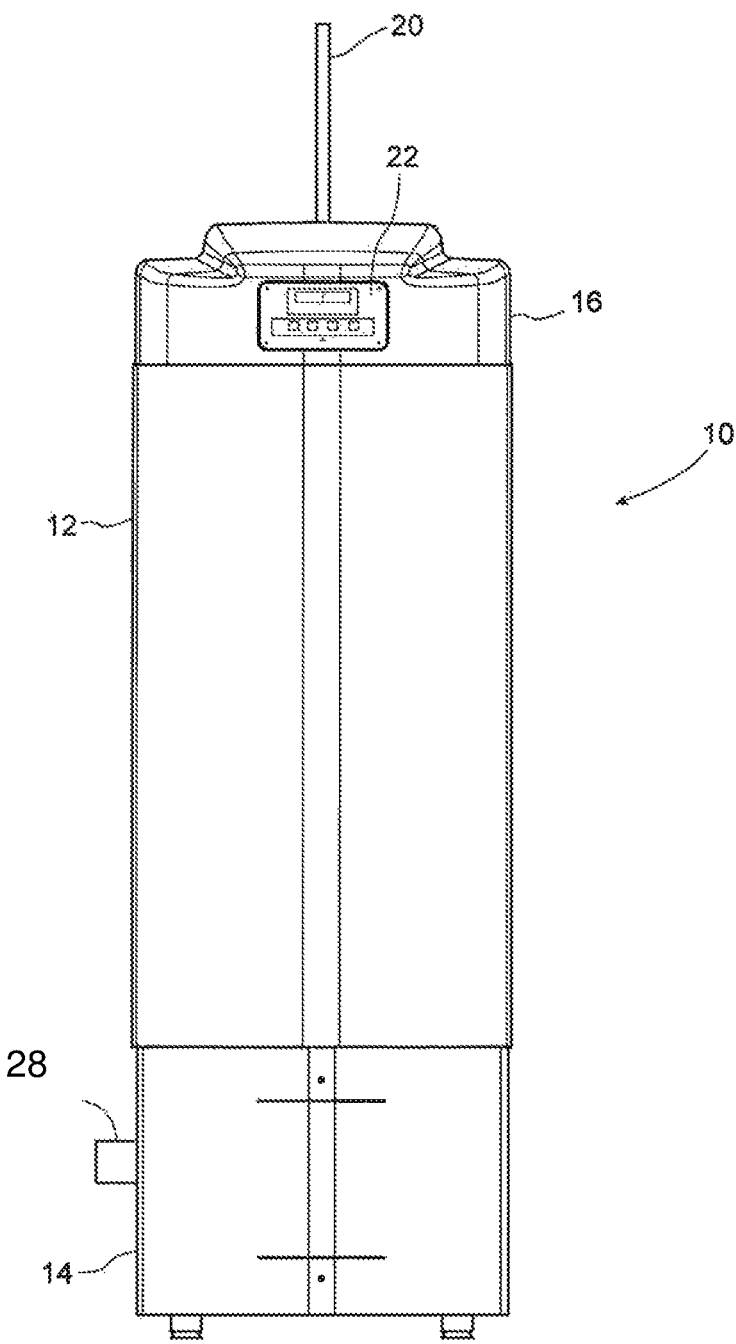
FIG. 1 is a front view of the outside of a greywater recovery and reuse system according to the present invention.

FIG. 1 shows a greywater recovery and reuse system 10 according to the present invention. The system 10 includes a body 12 which has a base 14 and a top chassis 16. Preferable the base incorporates metal to support the weight of the body 12, and the top chassis is a single molded plastic part for ease of assembly and reduced costs.

Located between the base and the top chassis is a tank which makes up the bulk of the body 12 as explained in more detail below.

Figure 1A:
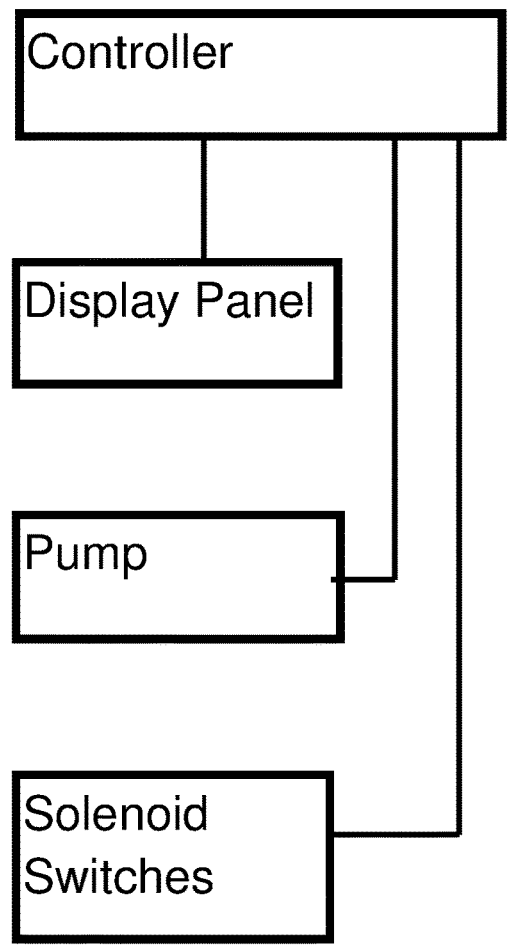
FIG. 1a is a grammatical diagram of the connections between the controller, display panel, pump, and solenoids.

Also shown are an outlet wastewater connection 28 and a greywater recirculation line 20. A display panel 22 is shown in the top chassis 16. A controller is connected to the display panel and a pump, solenoid switches and the like contained within the system 10 as grammatically shown in FIG. 1A. As will be understood by those skilled in the art, wiring will connect the control panel to the various components, and in turn the control panel will be connected to a source of power, such as by being plugged into a wall socket. In overall size the body 12 is preferred to be about five feet tall and about two to three feet in diameter, although the overall dimensions are not critical.

Figure 2:
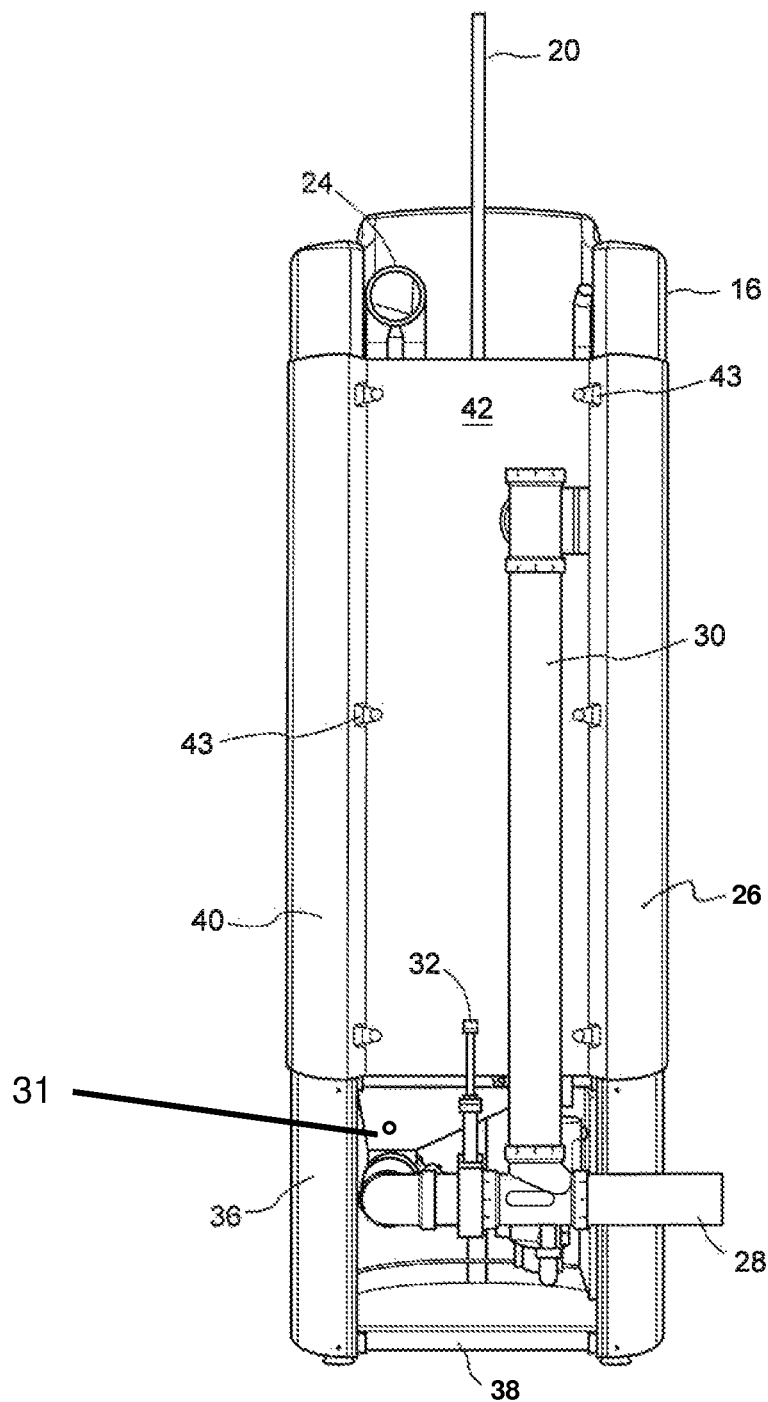
FIG. 2 is a rear view of the outside of the greywater recovery and reuse system of FIG. 1.

FIG. 2 shows the system 10 from behind. In this view more of the plumbing connections are visible. Located in the top chassis 16 is a greywater inlet connection 24. As will be appreciated by those skilled in the art the present invention is directed to recovering and using greywater collected from showers, baths, bathroom sinks and the like. The present invention excludes wastewater from other sources that may have a higher biological load such as blackwater from toilets and wastewater from kitchen sinks, washing machines, dishwashers and the like. The greywater that is collected for recovery is directed through a separate greywater plumbing network in the building or dwelling to the greywater inlet plumbing connection 24. The other liquid input into the system 10 is a fresh water inlet line which is connected to the water source in the house and discussed in more detail below.

FIG. 2 also shows the bottom of a tank 26 with an outlet wastewater connection 28 and a vent stack 30. An emergency manual release outlet valve 32 is also shown. Although not shown it will be appreciated by those skilled in the art that the outlet wastewater connection 28 will be connected to the sanitary sewer system of the building in a conventional manner.

FIG. 2 also shows a skirt 36 which surrounds a base frame 38 which is part of the base 14. The frame 38 supports a tank 40 above the floor. The tank 40 may be molded from any suitable plastic material or may be fabricated from metal although plastic is preferred for cost and weight reasons. In turn, the frame 38 is preferably formed from metal, but also may be made from a combination of plastic and metal such as aluminum if made sufficiently strong to carry the weight of recycled and recovered greywater contained in the tank 40. A protective cover 42 is provided on the back of the system 10. The cover 42 covers a number of plumbing and electrical connections that are further described below. Most preferably the cover 42 is removable by reason of fasteners 43 to permit servicing of the plumbing connections as needed.

Figure 3:
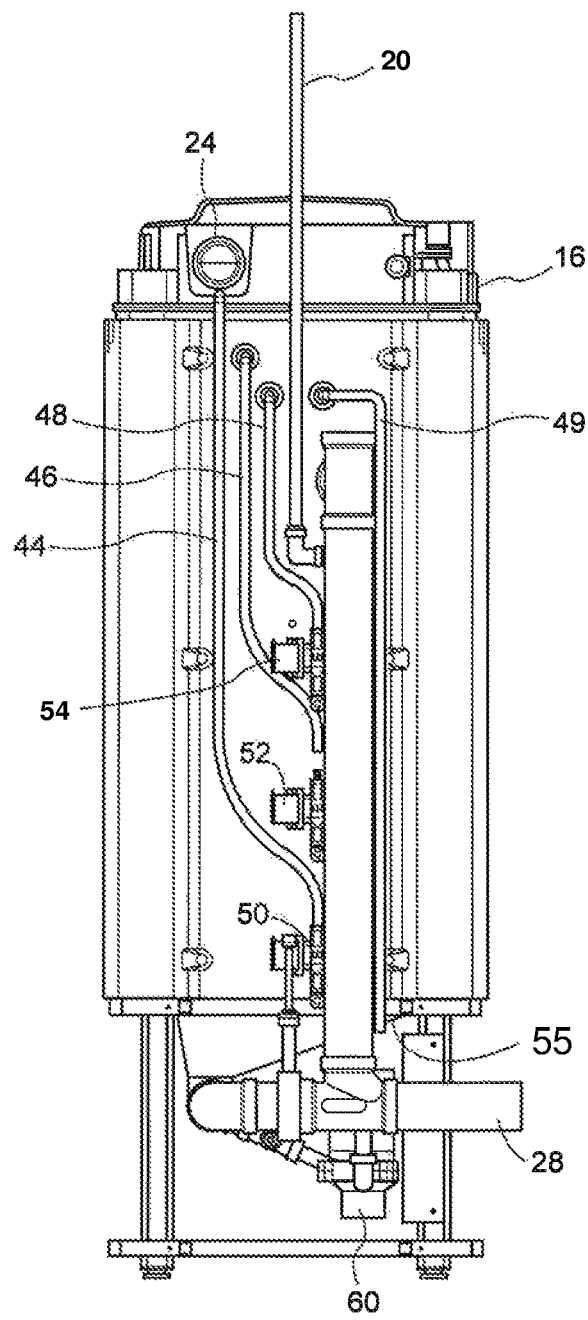
FIG. 3 is the same view as FIG. 2 with a rear panel removed for illustration purposes.

FIG. 3 shows the system of FIG. 2 with the protective cover 42 removed.

The greywater recirculation line 20 can be seen extending above the system 10. This is a line out from the system 10 to meet the demand, for example, for reconditioned greywater from a flushed toilet for example.

Also shown is a filter wash line 44, a chlorinator recirculation or sterilizer line 46, a purge line 48 and a dye line 49. Each line 44, 46 and 48 has an associated solenoid 50, 52 and 54. The dye line 49 has a small pump 55 connected to it. Most preferably the lines 44 to 49 are formed from plastic and connected by means of conventional elbows or the like to the solenoids. The solenoids are connected to the controller and the operation of the solenoids according to a control system of the present invention is described in more detail below.

Located below the tank 26 is a main pump 60, which has the function of moving the liquids through the system. The pump 60 is controlled by means of a line pressure switch or sensor which detects the line pressure within the primary greywater return line. The line pressure switch is operatively connected to an on off switch for the pump whereby upon the pressure dropping the pump starts until such time as the pressure is re-established as sensed by the line sensor. Preferably, the controller includes a relay switch or a means to turn off the power to the pump 60. In addition the pump is operatively connected to the controller of the control system so that the length of time the pump runs can be measured. In this way pumped volumes can be determined. It will be understood by those skilled in the art that operatively connected in this sense means connected electronically or otherwise so that the desired information or signals can be communicated between the elements so connected. As described below, through the use of the calculated volumes, or based on elapsed times measured by one or more timers, the controller can open and close solenoid valves to control the line pressure, which in turn controls the pump on off status, which in turn controls volume of reconditioned greywater pumped by the pump in response to any given event. In this way the control system controls the activation of the pump 60 through the operation of the solenoid valves 50, 52 and 54. The pump is connected to the greywater recirculation line 20 and in turn the lines 44 to 48 are connected to the recirculation line 20.

Figure 4A:
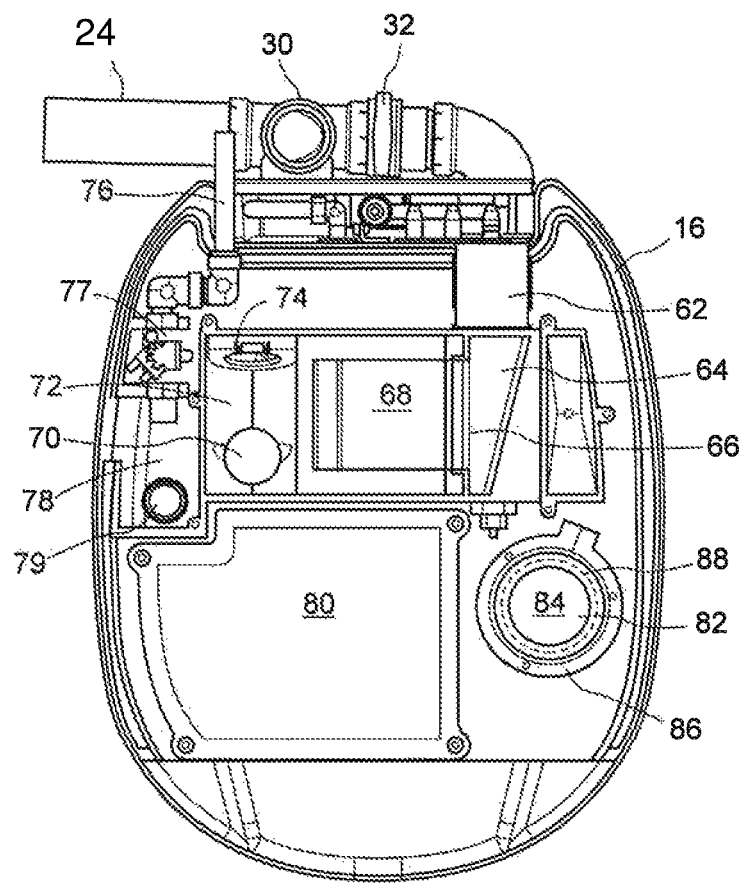
FIG. 4a is a top view of the system of FIG. 1 with a top panel removed for illustration purposes.

FIG. 4a shows a top view of the system 10 with a top cover removed to show details of the top chassis 16. The greywater inlet connection 24 includes a short section of pipe 62. This section of pipe 62 opens onto a spillway 64. The spillway 64 includes an overflow edge 66 which is located above a filter 68. The overflow edge has the effect of evening out the flow of water spilling over the edge and falling onto the filter to better allow the filter to capture the greywater. The filter is for the purpose of removing larger solids from the greywater, such as hair, dirt and other particles. Most preferably the filter 68 is at an angle to horizontal of between 15 and 30 degrees, with 20 to 25 degrees being the most preferred. This angle promotes the shedding of solids off the filter during a greywater filing operation and may be referred to as a solids shedding angle. The filter has openings of between 50 µm and 200 µm, with 80 µm to 100 µm being the most preferred.

Located adjacent to the edge of the filter 68 is a drain 70 in an overflow trough 72. The drain 70 is connected to the wastewater system of the building. Also shown is a flapper valve 74 which is an overflow valve from the tank 26 (below). As can now be appreciated, in the event of an accidental overfilling of the tank 26, flapper valve 74 opens to permit overflow into the trough 72 and then into the drain 70. This flapper valve 74 is a safety feature of the present invention providing a direct overflow connection to the wastewater system, to avert any spills or the like from occurring by reason of any such overfilling.

Also shown in FIG. 4a is a fresh water fill line 76 with an associated solenoid 77. An air gap 78 is provided prior to a drain 79 which directs the fresh water into the tank 26. As will be explained in more detail below the fresh water line is to permit the tank to be initially filled, or topped up if needed to maintain a minimum amount of one flush of a domestic toilet at the ready. The air gap is provided to allow the fresh water to be added without compromising the fresh water above the solenoid with any contact with the greywater in the system 10 and the drain 79 includes a trap seal to control release of odors from the tank 26 though the drain 79.

Also shown in FIG. 4a is a removable cover 80 which provides access to the tank 26 below. As well, a disinfector 82 is shown which consists of a cover 84 on a receptacle 86 which is sized and shaped to house a chlorine puck 88. The cover 80 is removable to allow replacement chlorine pucks to be inserted into the receptacle 86. The receptacle 86 is provided with an inlet port to permit greywater to flow into the receptacle 86 and around the puck 88, thereby submerging it. Grooves are provided on the bottom to permit the water being circulated through the receptacle 86 to have good turbulent contact with a bottom surface of the chlorine puck for better chlorination. According to an embodiment of the present invention, the chlorine puck 88 is continuously submersed in the greywater to dissolve the chlorine puck 88 into the water. According to a preferred embodiment, the chlorine puck 88 is not continuously submersed to prevent the water inside the receptacle 86 from becoming superchlorinated. Instead the receptacle 86 is configured so that grey water flows into the receptacle 86 over the chlorine puck 88 and dissolving a portion of the chlorine puck as it flows over the chlorine puck 88.

Figure 4B:
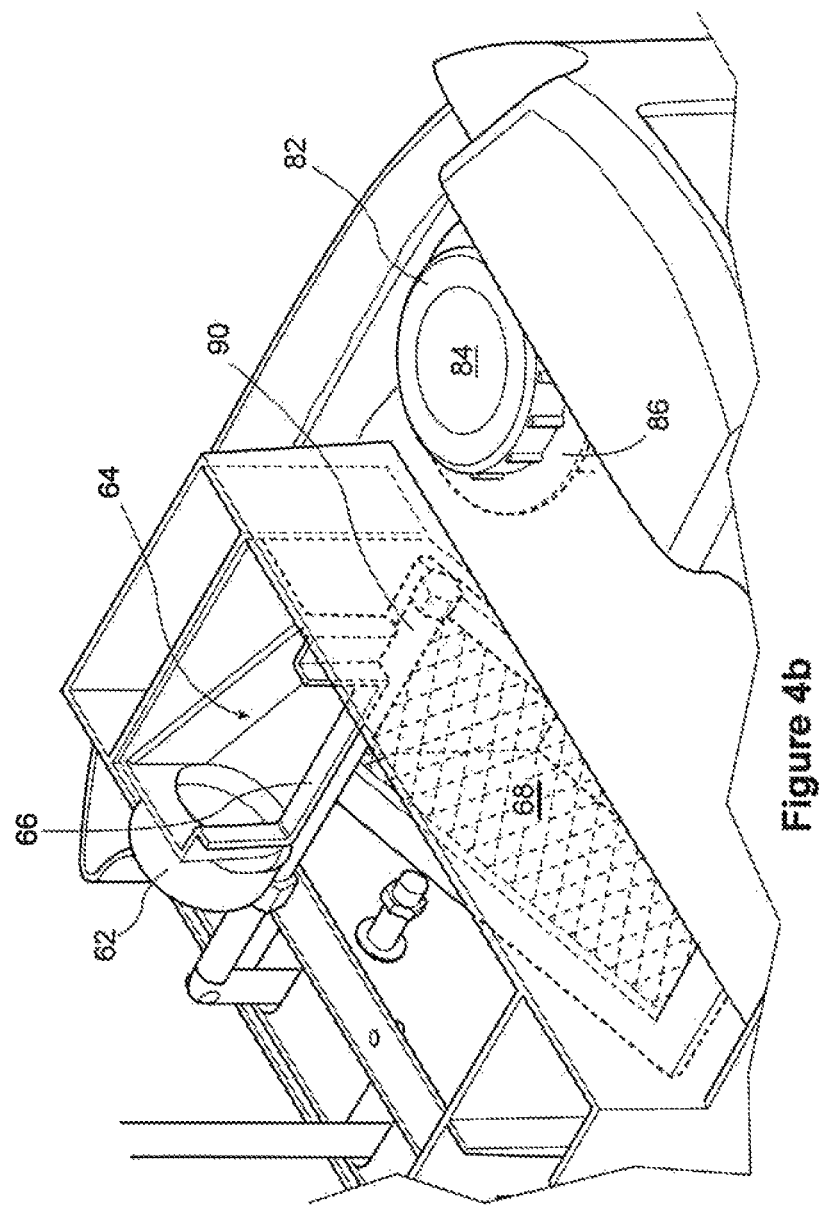

FIG. 4b shows a perspective view of a detail of the top chassis 16. In this view, the section of pipe 62, the spillway 64, and overflow edge 66 mentioned above, as well as their relation to filter 68 are more clearly seen. FIG. 4c shows a perspective view of a detail of the top chassis 16 according to another embodiment of the present invention. In this embodiment, the spillway 64 has been modified by removing the overflow edge 66, replacing it with a wall 67, and adding a spout 65 at the bottom of the spillway 64. Preferably, the spout 65 is cylindrical and configured to accurately deliver the greywater to the filter 68, resulting in better capture of water in tank 26 as compared to the embodiment shown in FIGS. 4a and 4b.

Figure 5:
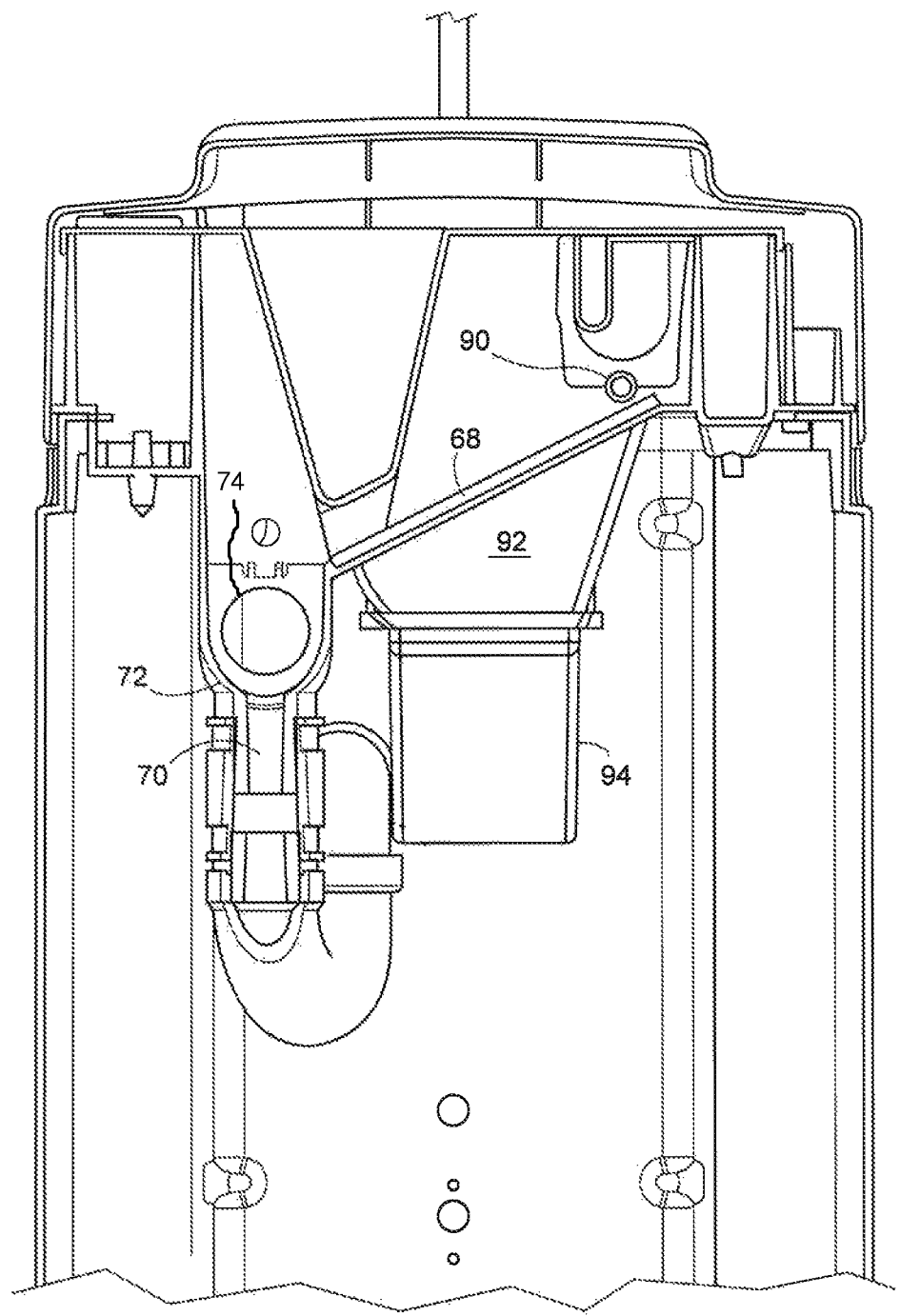
FIG. 5 is a cross sectional front view of the upper part of the system of FIG. 1.

FIG. 5 shows a cross-sectional view of the system 10. The filter 68 is shown in side view. Located just above the filter 68 is a spray nozzle 90 (best seen in FIG. 4b). The purpose of the spray nozzle 90 is to spray the filter 68 from above to cause any solid debris not already shed from the filter to be washed off the filter into the trough 72 and out through the drain 70. Preferably, the spray nozzle 90 is a tube with a plurality of apertures (not shown) configured to direct the spray at the filter 68. Most preferably according to the present invention this is done with reconditioned greywater sprayed onto the filter from above by means of positive pressure supplied by the pump 60 and in a sequence that is optimized to try to keep the filter free of blockages, such as by being done immediately upon the greywater filling operation ceasing. Below the filter 68 is a filter box 92. The filter box 92 simultaneously supports the filter in place at the preferred angle and collects water that passes through the filter 68. Below the filter box 92 is a chute 94. The chute 94 directs water passing through the filter into the filter box 92 and then into the chute 94 sideways so that the falling water steam impinges on the side of the tank 26. This has been found desirable as it tends to reduce the noise of the running water during a tank refilling stage.

In the embodiment shown in FIG. 4c the tubular spray nozzle 90 has been replaced with a spray nozzle 90' in the form of a jet which is supported on the wall 67 of the spillway 64 with spacer 63. The spray nozzle 90' is located just above the filter 68 and configured to spray the filter 68 from above to cause any solid debris not already shed from the filter to be washed off the filter 68 into the trough 72 and out through the drain 70, in a similar manner as described above in connection with the embodiment shown in FIGS. 4a and 4b.

Figure 6:
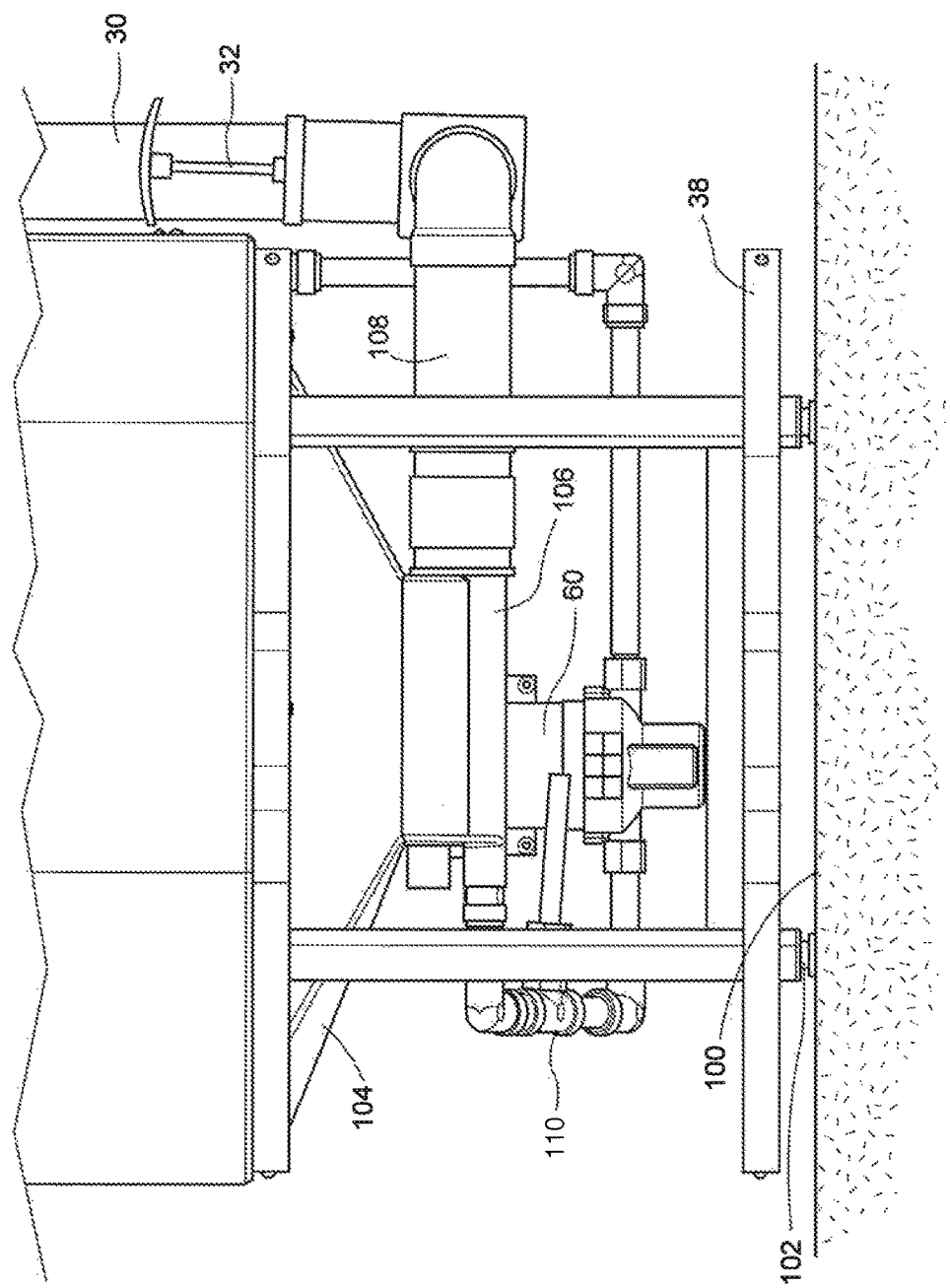
FIG. 6 is a side view of a bottom portion of the system of FIG. 1 with a skirt removed for illustration purposes.

FIG. 6 shows a close-up view of a bottom portion of the system 10 with the skirt 36 removed. As shown, the stand 38 supports the tank 26 above the level of a supporting surface such as a floor 100. The stand 38 also includes leveling feet 102 which are height adjustable to allow the system 10 to be leveled. As can now be understood by supporting the tank 26 above the floor 100 room is provided for various plumbing components such as the pump 60 and connections as shown.

According to the present invention the tank 40 includes a sloped bottom 104, which ends in a rounded collection channel 106. Extending off one side of the collection channel 106 is the wastewater drain 108, which connects to the sanitary sewer pipe of the dwelling in a manner previously described. The vent stack 30 and the manual emergency release valve 32 are also shown.

Extending from the opposite side of the collection channel 106 is the pump feed line 110 which feeds the pump 60. As shown the pump 60 is located below the tank 26 and so when activated can totally drain the tank 26. The pump has a number of functions as described in more detail below and is controlled by pressure sensors and monitored by a controller according to a preferred operating sequence. In general the pump is an electrically powered pump which is connected to a pressure sensor which is located downstream of the pump 60 and is used to detect demand for greywater in the main discharge line 20, among other things. The pressure sensor described above to permits the pump to be turned on when there is a need to move water from the tank, or otherwise through the system. For example, when a toilet is flushed a pressure change is detected in the main line 20, the pump 60 will respond by turning on and pumping reconditioned greywater back up to the toilet which has been flushed to refill the toilet tank or to supply flush water as needed.

The sloped bottom 104 of the tank 26 is preferred because it allows suspended fine particles which might have passed through the filter to settle out in a confined area for efficient removal or purging. Further, any accumulations of biological material that grow, accumulate and settle will also be able to be concentrated by the sloped bottom 104 into the collection channel 106 and thus more easily and quickly removed from the tank through a short or mini purging operation controlled by the controller. In addition to the short purging operation, the present invention comprehends a full purge of the tank 26 periodically.

Figure 7:
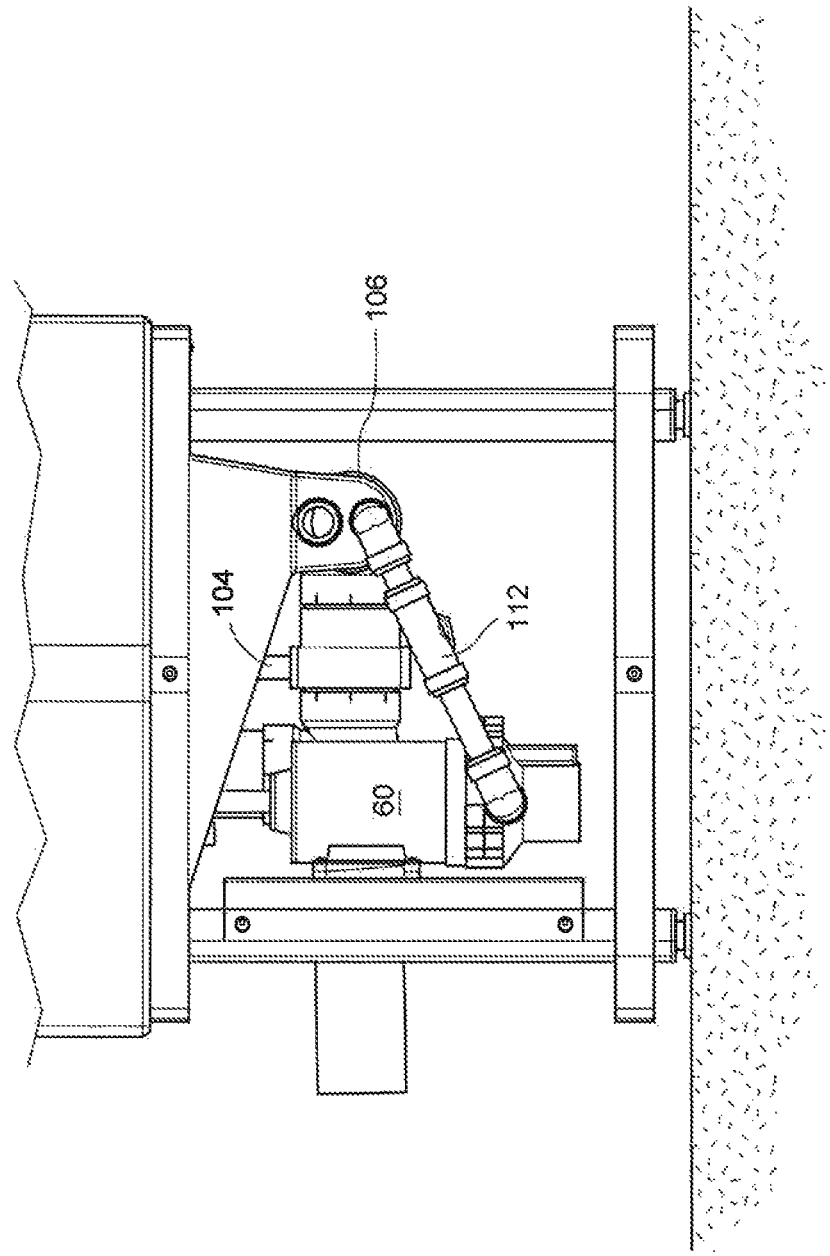
FIG. 7 is the same as FIG. 6 but from the front.
Figure 8:
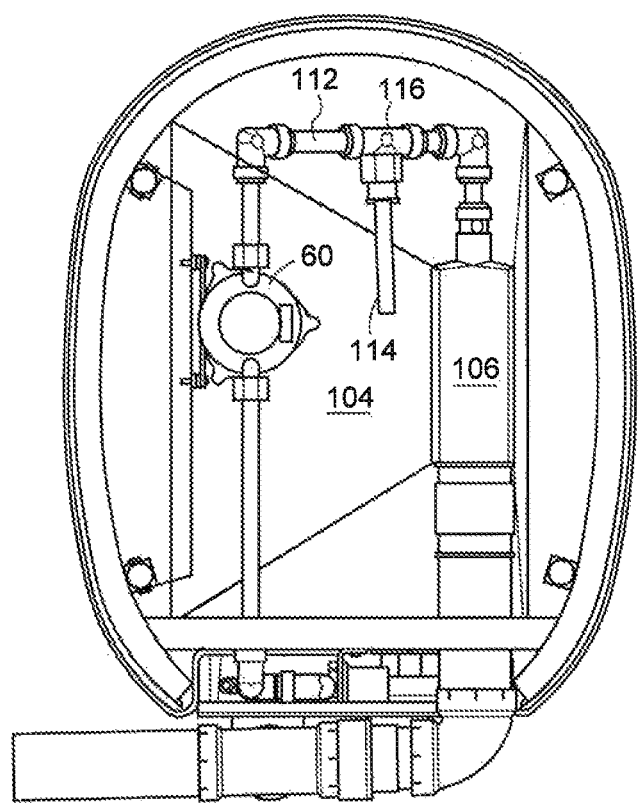
FIG. 8 is the same as FIG. 6 but from below.

FIG. 7 shows a side view of the sloped bottom 104 portion of the tank, and it can now be appreciated how the sloped bottom facilitates the collection of any settling debris or other material into the collection channel 106. FIG. 8 shows a view from directly below and shows a connection tube 114 which connects to the dye supply to a small dye pump (not shown) through connection 116.

As noted above the operation of the system 10 is governed by a controller 200 connected to the display 22. In FIGS. 9 through 15 flowcharts are shown depicting the sequence of steps of operation of the system 10 which are controlled or monitored by the controller 200. These flowcharts provide a preferred embodiment of the operation of the system 10 but it will be appreciated by those skilled in the art that other ways of operating a system are comprehended within the broad scope of the present invention, and the preferred flow charts represent only one embodiment thereof.

At step 210 the controller 200 is initialized and the visual display on the body 12 prompts the user for input. A series of initialization steps are shown including at 212 where the user sets the current time, 214 where the user sets the language preference, 216 where the user sets the choice of units to use in the visual display, 218 where the user sets the time to purge, 220 where the user sets the chlorination level, and 222 where the user selects whether to include a dye addition step. The present invention comprehends adding dye to the reconditioned grey water to present a more pleasing appearance in the toilets being supplied with the greywater and also to allow the user to visually confirm that there are no cross connections with the potable water system and that the system is operating as it should.

Next step is at 224 which consists of an initial fresh water addition to the tank. It will be noted that the system preferably includes a direct access to a source of fresh water through solenoid 77 (FIG. 4a). This sequence for this fresh water addition is shown beginning at 226, where the step of the controller opening of fresh water solenoid valve 116 is shown. At step 228, a holding tank level sensor 31, which can be a hydrostatic pressure transducer positioned at a bottom of the holding tank 26 as shown in FIG. 2, will detect a predetermined amount of water, in the preferred case approximately 20 L, and then at step 230 the controller closes the fresh water solenoid valve. This amount primes the system with enough initial water to permit at least one typical toilet flush.

At this point this system 10 is in idle mode represented by box 232. While in the idle condition a number of events can occur. Each of these are described below and include greywater entering from a source, a toilet being flushed thereby creating a demand for recycled and reconditioned greywater and the controller sensing low water condition due to evaporation or the like, or one or more alarm or service conditions which are explained in more detail below.

The box 234 shows what happens when greywater is added to the system from a source in the house or dwelling such as the occupant having a bath, shower or using the bathroom sink. In this embodiment this addition from source is detected by the tank pressure transducer which detects an increase in the water level in the tank and measures an increase in water volume within the tank at 236. This is accomplished by a calibration of the pressure transducer to the volume of water within the tank. Preferably, the tank pressure transducer is configured to detect the increase in the tank water level after a period of time that is sufficient to prevent excessive chlorination cycles. For example, good results have been obtained by detecting an increase in water level after a minimum of 80 seconds. At some point the water level increase stabilizes as shown in box 237. Once this happens a timer starts as shown in step 238.

At box 240 an alternate sequence begins with a toilet being flushed in the residence. Rather than representing an addition of water from a greywater source to the system 10, this represents a demand for recycled greywater from the system 10. This demand is detected by a change in pressure detected by the second sensor, which is a line pressure sensor. Good results have been obtained with the pressure sensor set to detect a pressure drop below 20 psi as shown in box 242. In the box 244 at this point if the dye pump is set to "on" then the dye pump will run during the flush cycle. This simply means that dye will be added to the reconditioned greywater. The controller continues to permit the pump to pump greywater until the toilet valve closes, as shown by box 246. In box 248 the controller measures the volume of water pumped by knowing the pump run time and using a prior calibration of the run time to a volume pumped. At 250 the controller uses this calculated volume to add to the total for the water saved display on the display unit of the controller. Once the line pressure rises above 20 psi, the pump stops at 251.

At 252, the next step is shown whereby the controller averages the volume measured per flush, and this average is the used as a bench mark for maintaining a minimum water level in the tank 46. In other words the present invention ensures that the tank is always capable of delivering enough recycled and reconditioned greywater to resupply the toilet, and so the intention is to always have a sufficient reserve on hand for this purpose.

The average volume calculation is just one way of establishing this amount but it has yielded suitable results. As will now be understood an aspect of the present invention is to maintain a sufficient reserve in the tank to meet at least one unit volume of demand, which corresponds, for example, to one toilet flush. In this sense the solenoid connection to the fresh water system in combination with the pressure sensor enabling a volume of liquid within the tank to be measured permits the system to meet this minimum threshold.

The steps outlined beginning at box 254 can now be understood. At 254 a low water condition is sensed by the controller by means of a water level indicator. In response at 256 the controller opens the fresh water solenoid valve. Then at 258 the tank is refilled to a minimum level, for example, that level determined to be appropriate by the controller and sensed by means of the calibrated first pressure sensor described above.

Figure 9:
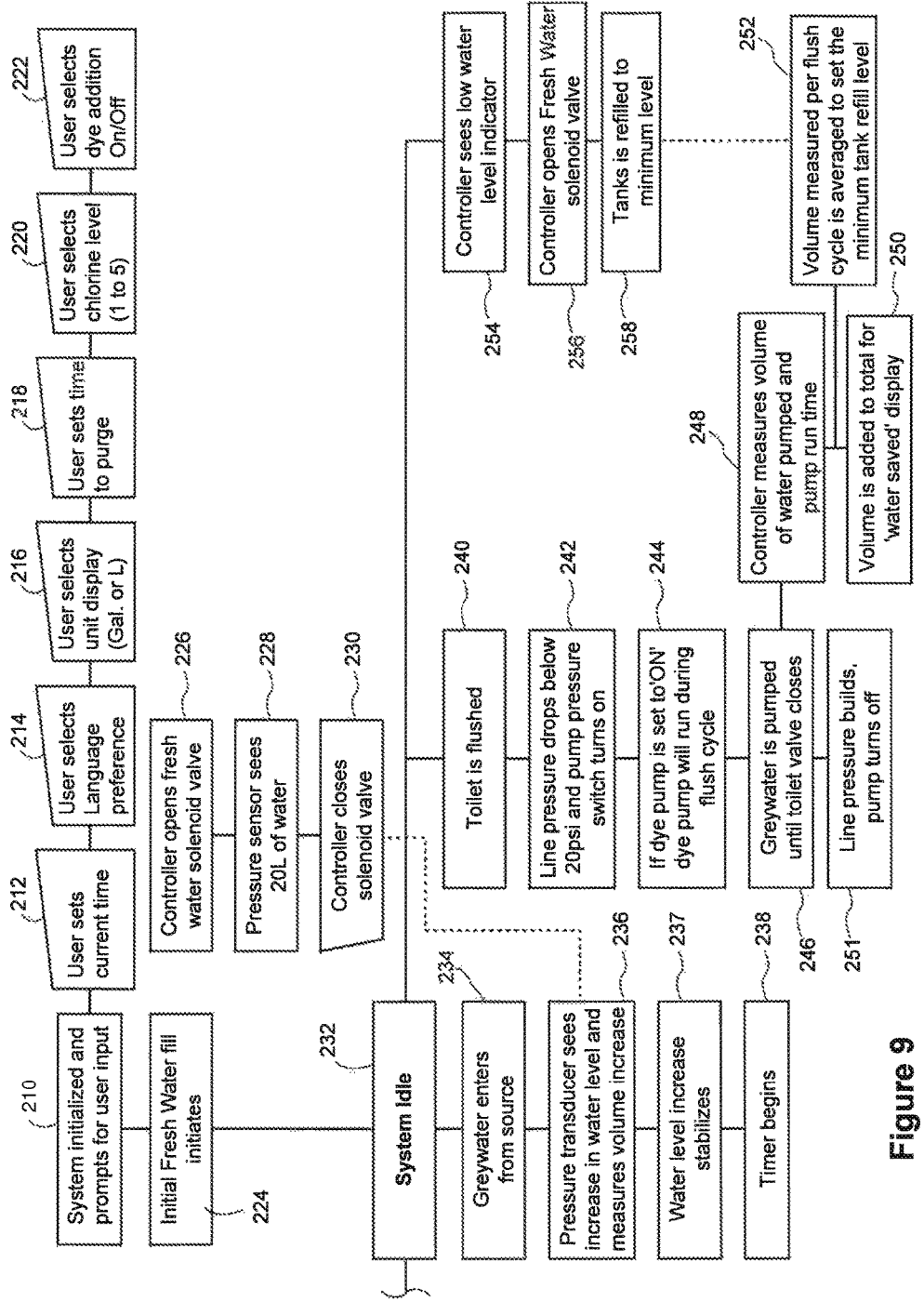
FIG. 9 is a view of part of a flow chart for a control system according to one embodiment of the present invention.
Figure 10:
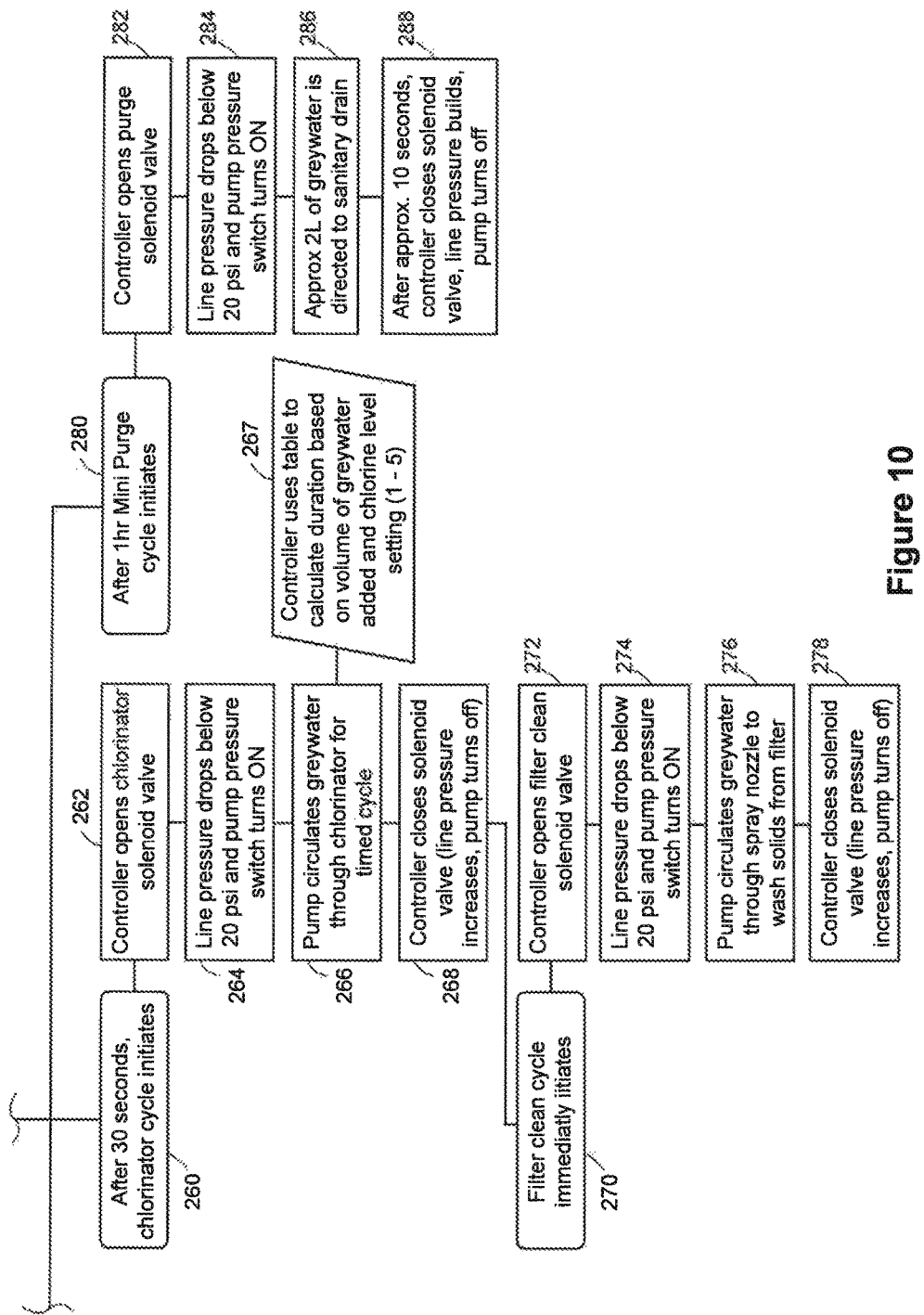
FIG. 10 is more of the flow chart for the control system of FIG. 9.

FIG. 10 begins with box 260 which is next in sequence from the box 238 in FIG. 9. According to this embodiment, 30 seconds after initiation of the timer of box 238, a chlorinator cycle begins as shown by box 260. This involves the controller opening chlorinator solenoid valve at 262, the second sensor detects a line pressure drop below 20 psi, turning the pump pressure switch on at 264, and permitting the pump to circulate greywater through the chlorinator for a timed duration at 266. Step 264 is achieved by the controller using a table to calculate the amount of pumping for the chlorination cycle based on a volume of greywater added and the chlorine level setting as shown by 267.

Then at 268 the controller closes the chlorination cycling solenoid valve causing the line pressure to increase and the pump to turn off.

Then, according to the present invention, at box 270 a filter clean cycle immediately initiates. In this case the controller opens the filter clean solenoid valve at 272 and the line pressure drops below 20 psi which in turn activates the pump pressure switch at 274, and then the pump circulates greywater through the spray nozzle to wash solids from the filter at 276. As described above the spray onto the sloped filter washes the solids not passing through the filter off the filter and into the trough and then out through the waste drain. After this the controller closes the solenoid valve, the line pressure increases and the pump turns off at 278.

Figure 11:
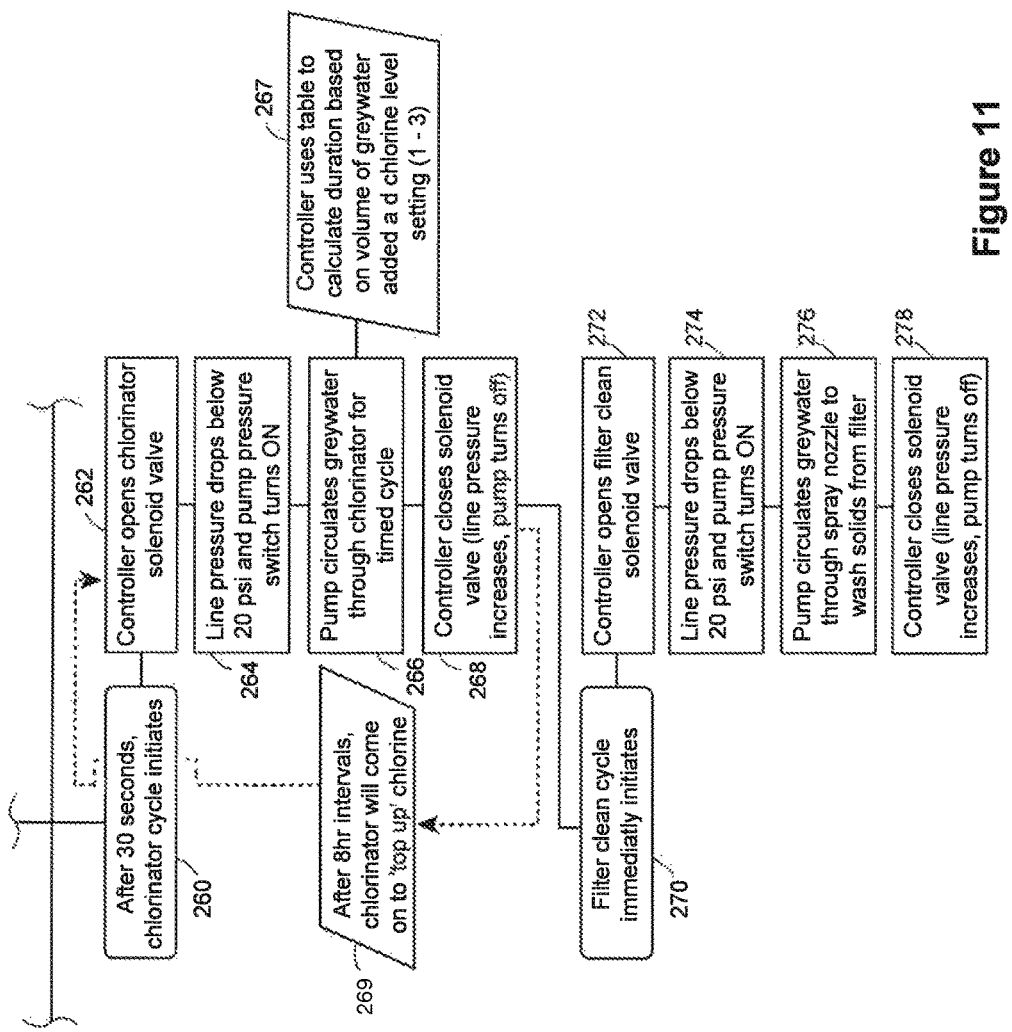
FIG. 11 shows a flow chart similar to the flow chart of FIG. 10 according to another embodiment of the present invention.

According to a preferred embodiment of the present invention, the chlorinator cycle includes turning on the chlorinator to "top up" chlorine at 8 hour intervals as shown in box 269 in FIG. 11. According to this embodiment, if after the controller closes the chlorination cycling solenoid valve at 268, an 8 hour interval has expired, the controller will turn on the chlorinator to "top up" chlorine at 269, as well as initiate the filter clean cycle at 270, which is discussed above. It will be appreciated that other intervals, such as for example 4 or 12, etc. hours may be used depending on design requirements. The chlorination top-up is required since over time, the chlorine level dissipates as it is oxidized in the water, this keeps the level of free chlorine between 0.5 ppm and 2.5 ppm (acceptable range). Then the controller initiates the chlorinator cycle again at box 260, opens the chlorinator solenoid valve at box 62 and so on as shown in the sequence in FIG. 11.

Referring back to FIG. 10, another feature of the present invention is shown beginning with box 280. In this case after a predetermined period, such as one hour from an event where greywater is added to the system, for example, by reason of an occupant taking a shower, a mini purge cycle is initiated by the controller. The purpose of the mini purge is to relatively quickly remove any solids which may have settled into the collector channel before they can become a problem. At 282 the controller opens the purge solenoid valve. At 284 the line pressure drops below 20 psi and the pump pressure switch turns on. At 286 approximately 2 L or a relatively small amount of greywater is directed to the sanitary drain. After approximately 10 seconds the controller closes the purge solenoid valve line, pressure rebuilds and the pump turns off as shown at 288. As will now be understood this step only removes a small volume from the tank, and most preferable a volume sufficient to empty the collection channel of collected sediments to the wastewater drain. This enables the system to maintain a cleaner operation, with less problematic greywater as the organic material in the collected sediments have been removed.

Figure 12:
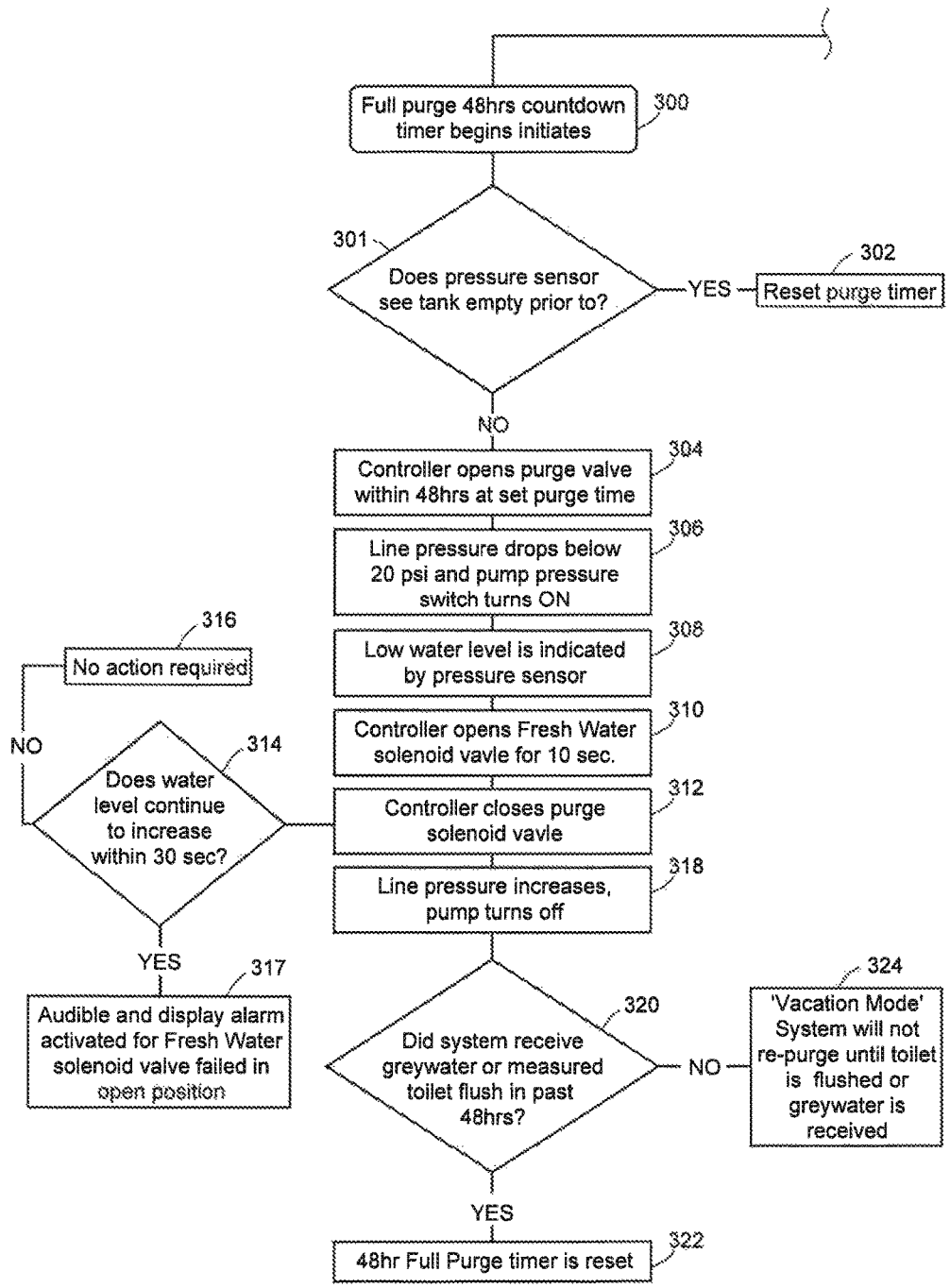
FIG. 12 shows further portions of the flow chart for the control system of FIGS. 9 and 10.

FIG. 12 shows other features of the present invention. In particular, a full purge cycle is shown. As will be understood by those skilled in the art, although the present invention includes a sterilizer which in the preferred form is a chlorinator, even so, the biologically laden, reconditioned greywater may have a tendency to become foul over time. To mitigate this effect, present invention provides for a periodic full purge of the tank, if there has been no other activity and the system has sat idle for a considerable period of time. Although a range of times could be used for this full purge, to initiating a purge after 48 hours seems to provide reasonable results although the purge time could be made longer or shorter depending upon the conditions, including the quality of the greywater being collected and the amount of chlorine being used.

At the top of FIG. 12 box 300 shows a purge timer countdown being initiated. Then a decision is made at 301 as to whether the pressure sensor has detected a tank emptying prior to the expiry of the purge timer. If so then the purge timer is reset at 302. If not then at 304 the controller opens the purge solenoid valve at 48 hours to initiate the purge. Then at 306 the line pressure drops below 20 psi and the pump pressure switch turns on. Then at 308, low water level is indicated by the pressure sensor at 310 the controller opens the fresh water solenoid valve for 10 seconds. Then at 312 the controller closes the purge solenoid valve. Then at 314 a decision is made. Does the water level continue to increase in a short period for example 30 seconds? If no, then no action is required at 316; if yes then an audible and display alarm is activated for freshwater solenoid valve which has failed in the open position at 317.

After the step 312 when the controller closes the purge solenoid valve, step 318 shows the line pressure increasing and the pump turning off, and another decision to be made at 320. This case the issue is whether the system has received greywater or has measured a toilet flush in the past 48 hours or whatever full purge time setting is preferred. If yes at 322 the full 48 hour full purge time is reset. If no, at 324 and the system is on vacation mode then the system will not repeat purge until a toilet is flushed or greywater is received. In this case vacation mode means a setting which can be chosen by the occupant where the idle period is extended by the controller to prevent pointless periodic purging when no one is using the building or its water systems. Even in vacation mode it might be appropriate to include periodic purges, however the purges would be very far between as the only water in the tank would be fresh water from fresh water refills after purges, which is less likely to go off if not used.

Figure 13:
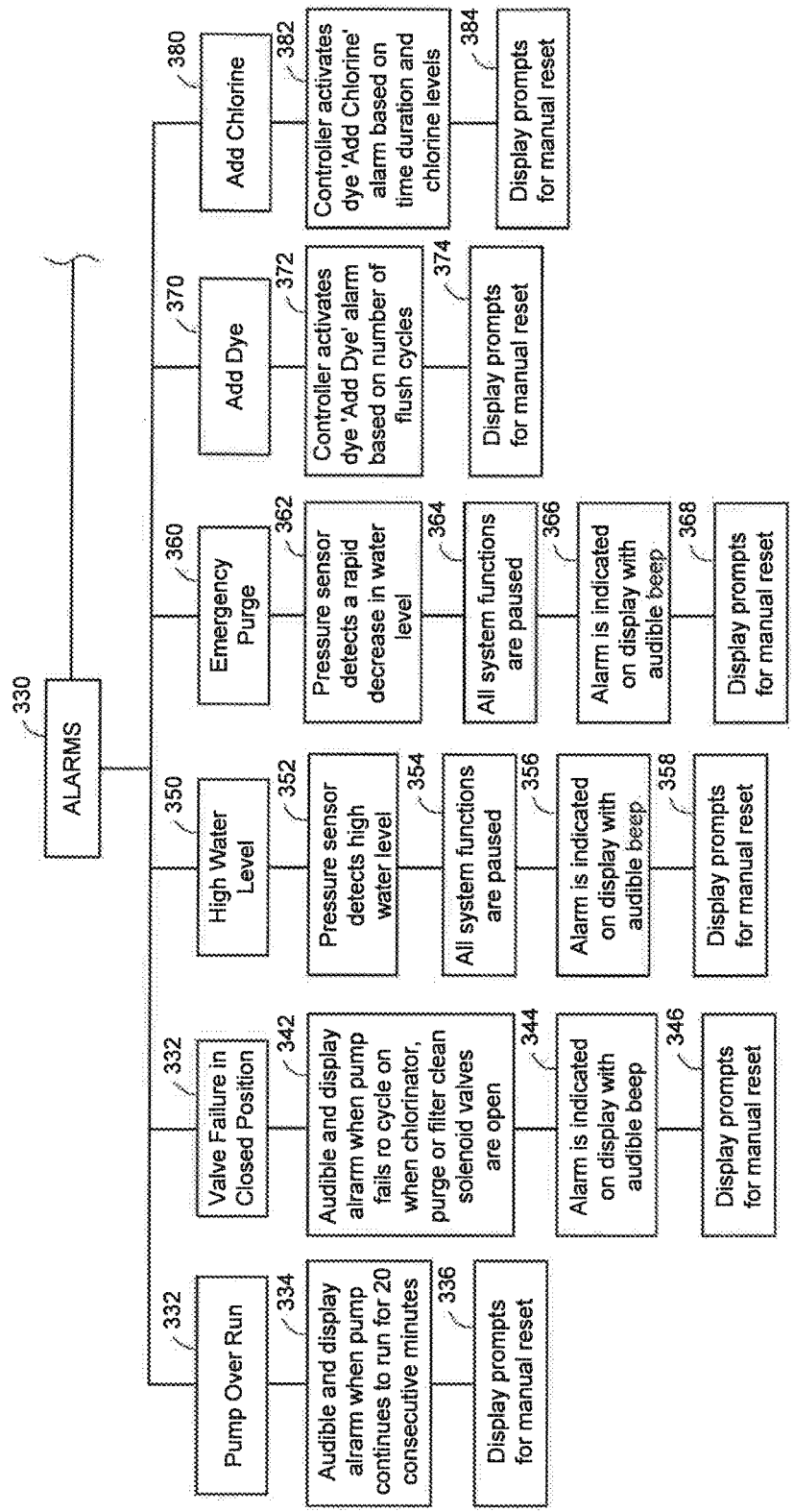
FIG. 13 is a flowchart for various alarm sequences of the control system of the present invention.

FIG. 13 shows a number of alarm detection safety features built into the system 10 under the title alarms at 330. Beginning at the left-hand side of FIG. 13 there is shown a pump overrun alarm 332. This results in an audible alarm and display alarm if the pump continues to run for 20 consecutive minutes or such other time as may be deemed appropriate, at 334. In this event the controller will terminate operation of the pump by means of a relay switch and the display will also preferably call for a manual reset at 336.

At 340 a valve failure in a close position is detected. This results in an audible and display alarm at 342 when the pump fails to cycle on when the chlorinator purge or filter clean solenoid valves are opened. The audible alarm may be in the form of an audible beep, for example, at 344 and again preferably the display prompts for manual reset at 346.

A high water level alarm is shown at 350. In this case the pressure sensor detects a high water level at 352. In this case all system functions are paused at 354 and an alarm condition is indicated with an audible beep and display function at 356. Again the display prompts for manual reset at 358.

An emergency purge alarm is shown at 360. The pressure sensor detects a rapid decrease in water level at 362. All system functions are paused at 364 and an alarm is indicated on the display with an audible beep and display message at 366. Again the display preferably prompts for a manual reset at 368.

An add dye detection cycle is shown at 370. In this case the controller activates the add dye alarm based on a number of flush cycles since the last add dye event as shown at 372. Then at 374 it is preferred to include a display prompt for a manual reset again.

Finally, an add chlorine condition is shown at 380. In this case the controller activates an add chlorine message alarm based on the elapsed time since the last chlorine event and also based on an owner selected chlorine level at 382. Once again it is preferred for the display to prompt for a manual reset at 384.

Figure 14:
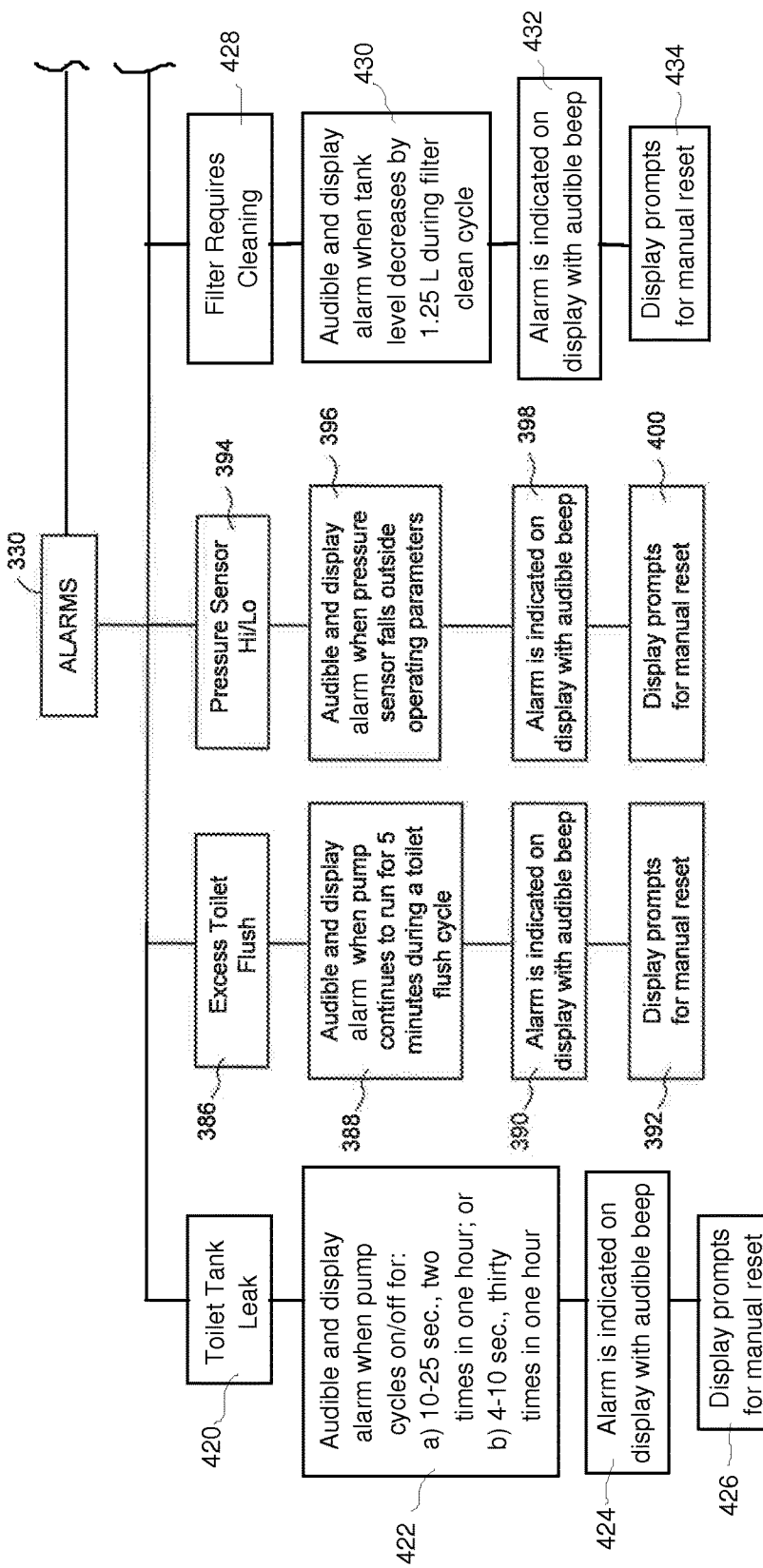
FIG. 14 shows a flow chart for additional alarm sequences of the control system of FIG. 13 according to another embodiment of the present invention.

FIG. 14 shows a number of additional alarm detection safety features built into the system 10 under the title alarms at 330 according to another embodiment of the present invention. Beginning at the left-hand side of FIG. 14 there is shown an excess toilet flush alarm 386. This results in an audible alarm and display alarm if the pump continues to run for 5 minutes during a toilet flush cycle, at 388. The audible alarm may be indicated on the display or in the form of an audible beep, for example, at 390 and preferably the display prompts for manual reset at 392.

At 394 a Hi/Lo pressure sensor gone out of calibration is detected. This results in an audible and display alarm at 396 when the pressure sensor falls outside of operating parameters. The audible alarm may be indicated on the display or in the form of an audible beep, for example, at 398 and again preferably the display prompts for manual reset at 400.

At 420 a toilet tank leak alarm is shown. It is estimated that up to 13% of home water use is wasted through leaks in fixtures. Toilets are a large contributor to this percentage since leaks can often go unnoticed for long periods of time. The most common types of toilet leaks are flush valve leaks and overflow leaks. When flush valves get old or misaligned, water can flow from the toilet tank past the valve seal and flow directly to the wastewater drain. In addition, if the toilet tank water level is set too high, water can flow into the overflow pipe and flow to the wastewater drain. In both of these situations, the problem will manifest as a toilet fill valve opening and the pump 60 cycling on and off for short periods of time at regular time intervals as the water level in the toilet tank is repeatedly topped up.

The preferred system 10 is capable of detecting such toilet tank leaks with the controller being configured to monitor activation of pump 60 for an identifiable signature of a toilet tank leak. For example, when there is no toilet tank leak, the pump 60 will turn on for approximately 35 to 55 seconds after a toilet is flushed, before turning off again. However, when a toilet tank leak is occurring, the pump 60 will cycle on and off for shorter periods of time, at consistent frequencies. For example, testing has shown that a toilet tank leak via a faulty flush valve causes the pump 60 to turn on for between 10 and 25 seconds at least twice within a one hour time period. On the other hand, a toilet tank leak via the overflow due to a faulty fill valve causes the pump 60 to turn on for between 4 and 10 seconds at least thirty times within a one hour time period.

By way of example, the preferred embodiment of the present invention employs a pump 60 which sends reconditioned greywater from the tank 26 to the toilet tank via a greywater circulation line 20 when a demand for reconditioned greywater is detected in the toilet tank. According to this example, demand for reconditioned greywater in the toilet tank is detected with a toilet tank level sensor associated with the pump, which senses a decrease in pressure in the greywater return line following the fill valve opening to fill the toilet tank to a predetermined level. In particular, the preferred toilet tank level sensor is a hydraulic pressure switch which activates the pump 60 when it senses a pressure drop in the reconditioned greywater circulation line 20 below 20 psi following the fill valve opening, and deactivates the pump when it senses the pressure reach 60 psi following the fill valve closing. Although the toilet tank level pressure switch is part of the pump 60 according to the preferred embodiment, it is also contemplated that it may be a separate component that may be operatively associated with the reconditioned greywater circulation line 20 instead. Furthermore, it is also contemplated that the toilet tank level pressure switch may be operatively connected to the controller so that activation of the pump 60 would be controller by the controller rather than by the toilet tank level pressure switch. It is contemplated that instead of the toilet tank level switch being a pressure switch on the pump of associated with the reconditioned greywater circulation line 20, it may be a float switch, or a resistance contact switch, etc., configured for mounting in the toilet tank. All of the above toilet tank level sensors and configurations thereof for detecting a demand for reconditioned greywater in the toilet tank and activating the pump 60 in response to such demand, are comprehended by the present invention.

By configuring the controller to monitor the frequency and durations that the pump 60 is activated, the controller may be used to detect the identifiable signature of the toilet tank leak at 422, and activate a visual and/or audible alarm to notify the user that a toilet tank leak has been detected, and more preferably to identify the type of toilet tank leak that has been detected (i.e. faulty flush valve, or faulty fill valve). Other identifiable signatures will now become apparent to persons skilled in the art, all of which are comprehended by the present invention. The audible alarm may be indicated on the display or in the form of an audible beep, for example, at 424 and again preferably the display prompts for manual reset at 426.

At 428 a filter requires cleaning alarm is shown. In certain conditions, high levels of $CaCO_3$ (calcium carbonate) or other minerals in the greywater can begin to adhere to the filter 68, effectively reducing the number of filter openings and causing greywater directed onto the filter 68 to be diverted directly to the drain 70, instead of passing through the filter 68 into tank 26. This buildup is precipitated by the constant wetting and drying of the filter 68. Once the buildup on the filter 68 progresses to a certain level, the overall performance of the system 10 degrades to the point that an unacceptable level of greywater becomes lost to the drain 70 rather than being recovered by the system 10. To restore performance of the system 10, the filter 68 must be replaced or cleaned manually, for example with acid based cleaners.

Accordingly, the preferred system 10 is configured to detect when the filter 68 requires cleaning by monitoring the level of reconditioned greywater in the tank 26 during the filter clean cycle for an identifiable signature of the filter 68 requiring cleaning. When an unclean filter 68 is detected, the system 10 preferably activates an alarm to notify the user.

As discussed above, when the filter clean cycle activates, reconditioned greywater is pumped from the bottom of the tank 26 to the nozzle 90 located above the filter 68 and positioned to spray reconditioned greywater on to the filter 68. When the filter 68 is clean, most of the reconditioned greywater sprayed on top of the filter 68 through nozzle 90 returns back to the tank 26 through the filter 68, while only a small amount of the reconditioned greywater water sprayed on top of the filter 68 is diverted by the filter 68 to the drain 70. Accordingly, when the filter 68 is clean the level of reconditioned greywater in the tank 26 remains substantially unchanged throughout the filter clean cycle. However, as the filter 68 begins to clog from $CaCO_3$ or other minerals in the greywater adhering to the filter 68, more reconditioned greywater is diverted by the filter 68 to the drain 70, instead of passing through the filter 68 back into tank 26. The result is that as the filter 68 becomes more clogged, the level of reconditioned greywater in the tank 26 begins to decrease more during the filter clean cycle as compared to when the filter 68 is clean. As mentioned above, this buildup is typically not removable by the filter clean cycle and once the level of buildup reaches an unacceptable level, the filter 68 must be replaced or cleaned manually, for example with acid based cleaners, to restore performance of the system 10.

Preferably, the controller is configured to monitor how much reconditioned greywater is lost to the drain 70 during the filter clean cycle using the pressure sensor in the tank 26. As mentioned above, the preferred pressure sensor is a hydraulic pressure transducer that generates a signal which the controller uses to measure the level of greywater in the tank 26 with a high level of precision. When the amount of reconditioned greywater lost during the filter clean cycle exceeds a predetermined value, the controller preferably notifies the user by an audible and visual alarm that the filter 68 requires cleaning. The audible alarm may be indicated on the display or in the form of an audible beep, for example, at 432 and again preferably the display prompts for manual reset at 434.

By way of example, the preferred embodiment of the present invention employs a 5.42 inch by 8.66 inch filter 68, which is optimized for the maximum typical flow of greywater from a shower or bath drain (approximately 10 GPM). For this size of filter 68, the filter clean cycle may be configured to spray reconditioned greywater on the filter 68 through nozzle 90 at a rate of about 10.5 litres/min. for about 25 seconds, which has been found to be sufficient to scour the filter, remove particles such as hair, lint, dirt, and debris gathered thereon, and to disinfect the filter to prevent growth of biofilm. At this spray rate and duration of the filter clean cycle, about 4.375 litres of reconditioned greywater is sprayed on to the filter 68. Tests have shown that when the filter 68 is clean, the level of reconditioned greywater in the tank decreases by about 0.250 litres. In other words, 4.125 litres returns back to the tank 26 through the filter 68, while 0.250 litres is lost to the drain 70. This means that when the filter 68 is clean about 94% of the reconditioned greywater typically returns back to the tank 26 during the filter clean cycle, while about 6% is lost to the drain 70. Tests have also shown that when the filter 68 becomes so clogged that only 71.5% of the reconditioned greywater returns to the tank 26 during the filter clean cycle (i.e. 28.5% is lost to the drain 70), performance of the overall system 10 has degraded to an unacceptable level. In the present example, 28.5% of the total amount of reconditioned greywater sprayed on to the filter 68 during the filter clean cycle is 1.25 litres. Accordingly, in the present example, the predetermined value for activating the alarm to indicate that the filter 68 requires cleaning is preferably a decrease in reconditioned greywater in the tank 26 of about 1.25 litres.

What is important is that the controller is configured to monitor the level of the greywater in the tank 26 during the filter clean cycle for an identifiable signature of the filter requiring cleaning. As mentioned above, one example of the identifiable signature is a decrease in the level of greywater in the tank 26 by a predetermined value during the filter clean cycle, which is preferably correlated with an unacceptable level of buildup on the filter 68 resulting in degraded performance of the system 10. In the above example, the predetermined value is a decrease in the level of grey water in tank 26 during the filter clean cycle by about 28.5% of the total reconditioned greywater sprayed on to the filter during the filter clean cycle. However, the above values may vary depending on the design considerations which will be apparent to persons skilled in the art. For example, it is contemplated that the predetermined value may be a decrease in the level of reconditioned greywater in the tank 26 in the range of 20% to 60% of the total amount of reconditioned greywater sprayed on to the filter 68 during the filter clean cycle. All such predetermined values are comprehended by the present invention.

Figure 15:
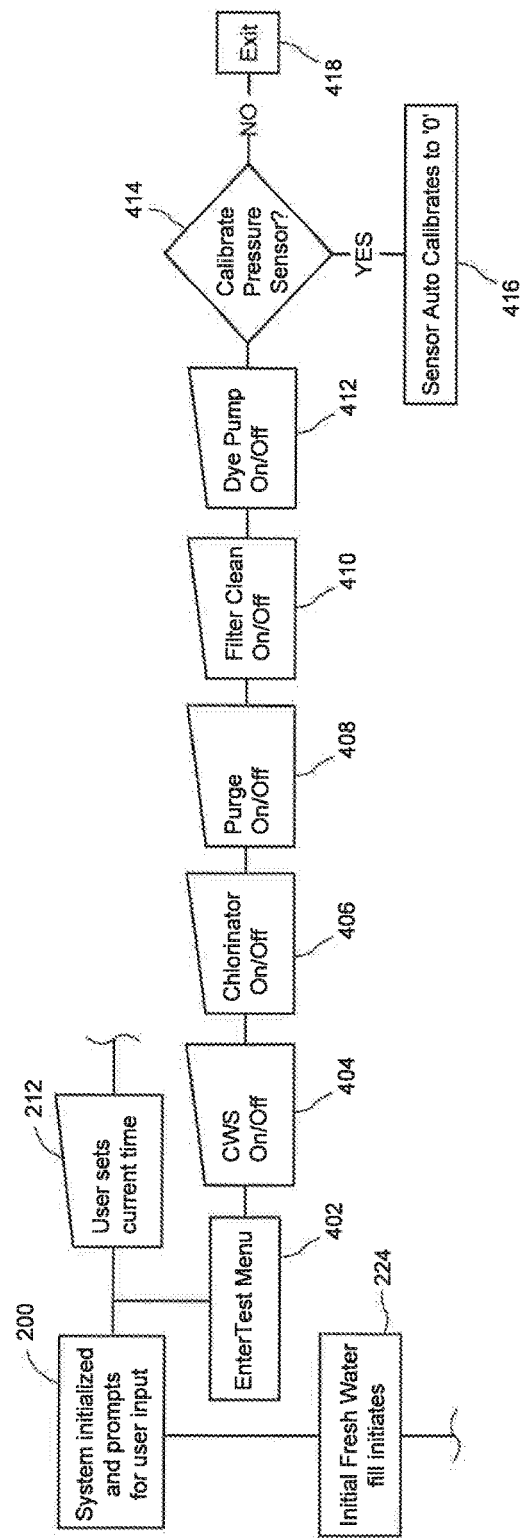
FIG. 15 shows a test menu sequence added to the flow chart of FIG. 9 according to another embodiment of the present invention.

FIG. 15 shows another feature according to an embodiment of the present invention. In particular, a test menu is shown at 402 which permits a user to test one or more components of the system 10. Preferably, the controller is configured to permit the user to enter the test menu sequence 402 after the system is initialized and prompts for user input at box 200. When the test menu sequence is initiated, the controller will turn CWS (Cold Water Supply) on and off at box 404. Then the controller will turn the chlorinator on and off at 406. Next the controller will turn the purge cycle on and off at 408. Then the controller will turn the filter clean operation on and off at 410. Then the controller will turn the dye pump on and off at 412. At 414, the user will be prompted to test the calibration of the pressure sensor or to exit the test menu sequence. If the user selects "yes" to calibrate the pressure sensor, the controller will automatically calibrate the pressure sensor to "0" at 416. If the user selects "No", the test menu sequence will exit at 418.

It will be appreciate that the foregoing description has been in respect of preferred embodiments of the invention and that many variations and alterations of the invention are possible within the broad ambit of the claims that are attached. For example, while the preferred material for the tank is plastic, other materials can also be used. Also, while the preferred sequence for operation of the device is set out above, the timing of the individual steps can be varied.

The embodiments of the invention in which an exclusive property or privilege is claimed are defined as follows:

1. A greywater recovery and reuse system for collecting and reconditioning greywater, said system comprising:
   a controller to control operation of said system;
   a greywater inlet connection connectable to a source of greywater;
   a holding tank configured to receive said greywater water from said greywater inlet connection;
   a greywater reconditioning system configured to recondition said greywater prior to being received in said holding tank, said reconditioning system comprising a filter positioned between said greywater inlet connection and said holding tank to filter the greywater to provide reconditioned greywater;
   a filter cleaning system for periodically applying said reconditioned greywater from said holding tank on top of said filter to clean contaminants from the top of said filter;
   an overflow trough positioned adjacent to an edge of said filter to receive said contaminants cleaned from the top of the filter and an amount of the reconditioned water applied by the cleaning system; and
   a holding tank level sensor positioned in said holding tank and operatively connected to said controller, said controller being configured to calculate a level of said reconditioned greywater in said holding tank from signals generated by said holding tank level sensor;
   wherein said controller is configured to monitor a change in said level of said reconditioned greywater in said holding tank during operation of said filter cleaning system to determine said amount of the reconditioned water received by the overflow trough, and wherein the controller is configured to determine when said amount of the reconditioned water received by the overflow trough exceeds a predetermined amount requiring manual cleaning or replacement of the filter.

2. The system as claimed in claim 1, wherein said controller is configured to activate an alarm upon detecting when said amount of the reconditioned water received by the overflow trough exceeds said predetermined amount.

3. The system as claimed in claim 1, wherein said predetermined amount is between 20% and 60% of a total amount of reconditioned greywater applied on top of said filter during said operation of said filter cleaning system.

4. The system as claimed in claim 1, wherein said predetermined amount is at least 1.25 litres.

5. The system as claimed in claim 1, further comprising a spillway connected between said greywater inlet connection and said holding tank, wherein said spillway includes one of an overflow edge and a spout for directing the greywater in a downward direction, said filter being positioned under one of said overflow edge and said spout, wherein said filter is disposed at a solids shedding angle relative to horizontal to permit greywater applied to the top of said filter to wash away solids into said overflow trough.

6. The system as claimed in claim 5, wherein said filter cleaning system comprises a spray nozzle positioned above said solids shedding filter to direct a spray of reconditioned greywater on top of said solids shedding filter.

7. The system as claimed in claim 5, wherein said solids shedding angle is between 35 and 15° degrees.

8. The system as claimed in claim 1, wherein said holding tank level sensor comprises a hydrostatic pressure transducer positioned at a bottom of said holding tank.

9. The system as claimed in claim 1, wherein said filter is a mesh filter having openings of between 50 μm and 200 μm.

10. The system as claimed in claim 1, further comprising a body housing said controller, said greywater inlet, said holding tank, said greywater reconditioning system, said filter cleaning system, said overflow trough, and said holding tank level sensor.

11. The system as claimed in claim 1, further comprising a discharge outlet pipe having one end connected to the holding tank and the other end connectable to a sanitary sewer system.

12. The system as claimed in claim 1, further comprising a freshwater inlet pipe having one end connected to said holding tank and the other end connectable to a source of fresh water.

13. The system as claimed in claim 1, wherein said greywater reconditioning system further comprises a disinfector for disinfecting said greywater received in said holding tank.

\* \* \* \* \*